United States Patent [19]
Duren et al.

[11] Patent Number: 6,021,379
[45] Date of Patent: *Feb. 1, 2000

[54] METHOD FOR RECONSTRUCTING SEISMIC WAVEFIELDS

[75] Inventors: Richard E. Duren, Conroe; Erik A. Eriksen; Eugene Clark Trantham, both of Houston, all of Tex.

[73] Assignee: Exxon Production Research Company, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/902,318

[22] Filed: Jul. 29, 1997

[51] Int. Cl.⁷ ............................................... G06F 19/00
[52] U.S. Cl. .............................. 702/16; 702/17; 367/73
[58] Field of Search ................................. 702/17, 18, 16, 702/14; 367/50, 51, 52, 56, 58, 73

[56] References Cited

U.S. PATENT DOCUMENTS

| | | | |
|---|---|---|---|
| 4,380,059 | 4/1983 | Ruehle | 367/46 |
| 4,437,176 | 3/1984 | Mack | 367/38 |
| 4,594,693 | 6/1986 | Pann et al. | 367/43 |
| 4,597,066 | 6/1986 | Frasier | 367/38 |
| 4,665,510 | 5/1987 | Foster et al. | 367/21 |
| 4,829,487 | 5/1989 | Malloy | 367/40 |
| 5,197,039 | 3/1993 | Corcoran et al. | 367/52 |
| 5,500,832 | 3/1996 | Berryhill | 367/51 |
| 5,596,546 | 1/1997 | Wisecup | 367/47 |
| 5,596,547 | 1/1997 | Bancroft et al. | 367/51 |
| 5,648,938 | 7/1997 | Jakubowicz | 367/56 |

FOREIGN PATENT DOCUMENTS 2 282 665  4/1995  United Kingdom.

OTHER PUBLICATIONS

Robein, Etienne; Raynaud, Bernard; and Sexton, Paul A. "Accurate Simulation of the Kinematics of DMO in Travel–Time," EAGE 57th Conference and Technical Exhibition, Glasgow, Scotland (29 May–2 Jun. 1995) EAEG Division, Paper N. E043.

Brink, Mundy; Strudley, Alan; and Larssen, Bengt. "Effects of Seismic Acquisition Geometry on Seismic Processing—Analysis of the DMO Techniques," EAGE 57th Conference and Technical Exhibition, Glasgow, Scotland (29 May–2 Jun. 1995) EAEG Division, Paper No. C024.

Jakubowicz, Helmut. "Wavefield Reconstruction," 64th Annual SEG International Meeting, Los Angeles, Calif. (Oct. 23–28, 1994) Paper No. SP4.8, pp. 1557–1560.

Jakubowicz, Helmut. "Wavefield Reconstruction," EAGE 56th Meeting and Technical Exhibition, Vienna, Austria (6–10 Jun.1994), Paper No. H055.

Vermeer, G., *Seismic Wavefield Sampling: A Wave Number Approach to Acquisition Fundamentals*, Edited by Michael R. Cooper, Society of Exploration Geophysicists, 1990.

Ronen J., "Wave–equation trace interpolation," *Geophysics*, vol. 52, No. 7, Jul. 1987, pp. 973–984.

Black, J. L. et al., "True–amplitude imaging and dip moveout," presented at the 58th Annual International Meeting of the Society of Exploration Geophysicists, 1993.

Ronen, S. et al., "Spatial dealiasing of 3–D seismic reflection data," *Geophys. J. Int.* (1991) pp. 503–511.

Spitz, S., "Seismic trace interpolation in the F–X Domain," *Geophysics*, vol. 56, No. 6, Jun. 1991 pp. 785–794.

*Primary Examiner*—Donald E. McElheny, Jr.
*Attorney, Agent, or Firm*—Keith A. Bell

[57] ABSTRACT

A method for reconstructing a selected seismic wavefield at a designated common midpoint and offset location from a set of prestack seismic data traces. The method uses actual data traces from other common midpoint and offset locations to reconstruct the selected wavefield at the designated reconstruction location. The method may be used to reconstruct any selected wavefield, including both primary reflection wavefields and secondary wavefields such as water-bottom multiple wavefields, and may be used with both 2-D and 3-D seismic data. If the reconstructed wavefield is a secondary wavefield, it may be subtracted from the prestack seismic data traces to eliminate interference between wavefields. The method may also be used to reconstruct data from missing shots to avoid spatial aliasing problems in other data processing operations.

17 Claims, 11 Drawing Sheets

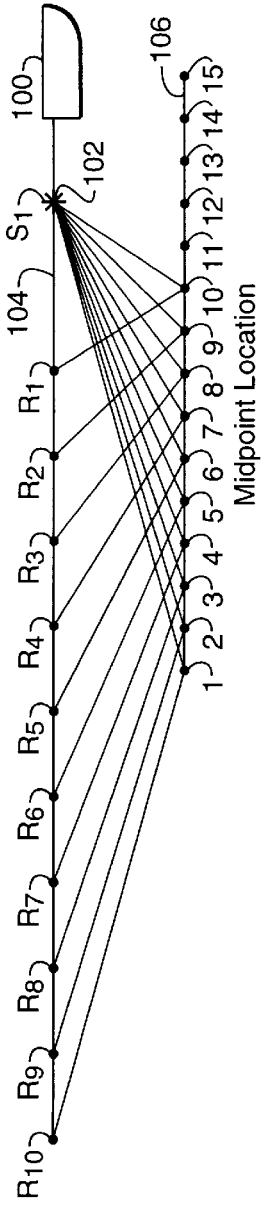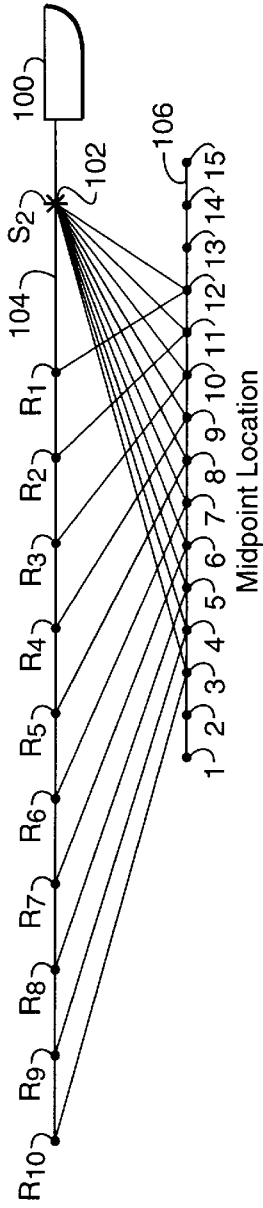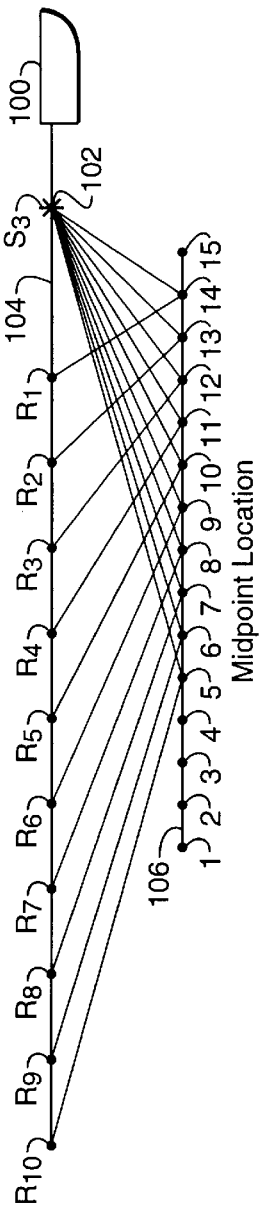

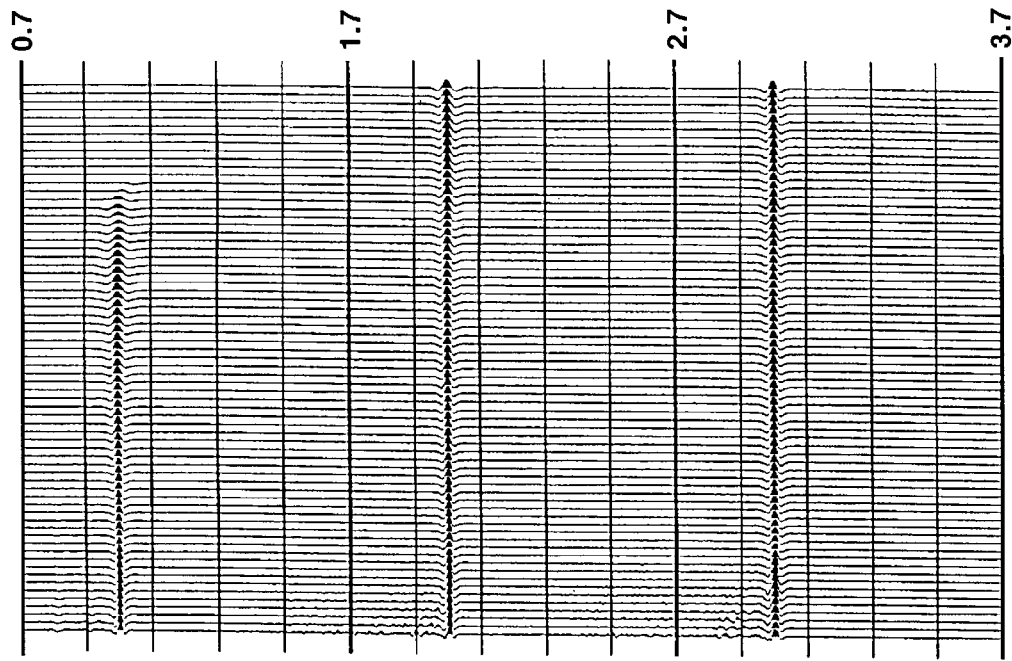
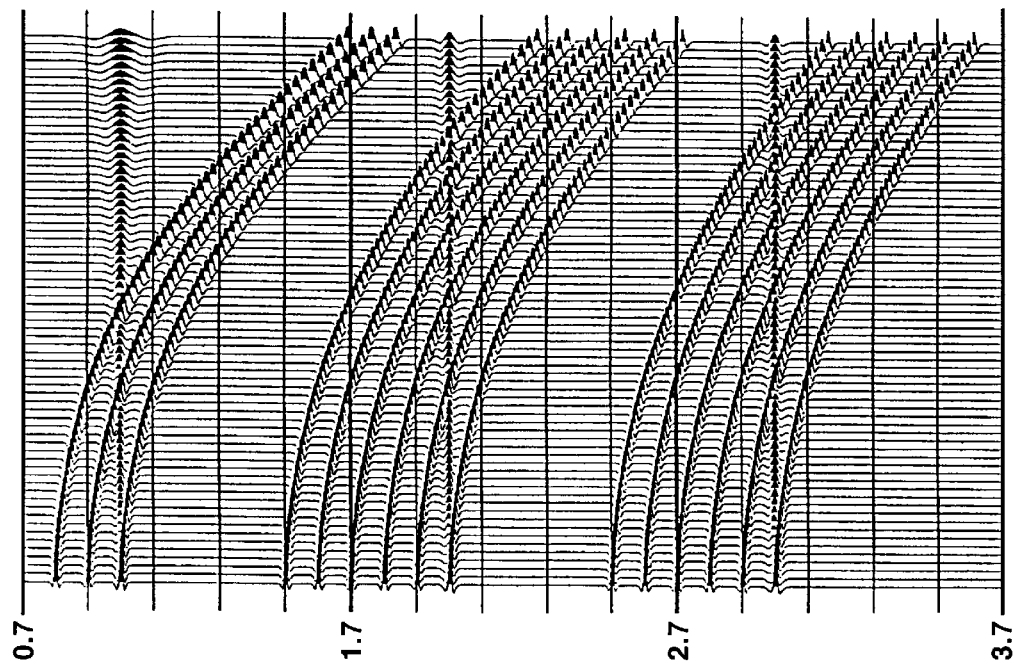
*FIG. 7B*
*FIG. 7A*

METHOD FOR RECONSTRUCTING SEISMIC WAVEFIELDS

FIELD OF THE INVENTION

This invention relates generally to the field of seismic prospecting and, more particularly, to seismic data acquisition and processing. Specifically, the invention is a method for reconstructing the seismic wavefield at a designated common midpoint and offset location from prestack seismic data traces for other common midpoint and offset locations.

BACKGROUND OF THE INVENTION

In the oil and gas industry, seismic prospecting techniques are commonly used to aid in the search for and evaluation of subterranean hydrocarbon deposits. In seismic prospecting, a seismic source is used to generate a seismic signal which propagates into the earth and is at least partially reflected by subsurface seismic reflectors (i.e., interfaces between underground formations having different elastic properties). The reflections are detected and measured by seismic receivers located at or near the surface of the earth, in an overlying body of water, or at known depths in boreholes, and the resulting seismic data may be processed to yield information relating to the subsurface formations.

Seismic prospecting consists of three main stages: data acquisition, data processing, and interpretation. The success of a seismic prospecting operation is dependent on satisfactory completion of all three stages.

The most widely used seismic data acquisition and processing technique is the common midpoint (CMP) method. The midpoint is the point midway between the source and the receiver. According to the CMP method, each seismic signal is recorded at a number of different receiver locations and each receiver location is used to record seismic signals from a number of different source locations. This results in a number of different data traces having different source-to-receiver offsets for each midpoint. The resulting data traces are corrected for normal moveout (i.e., the variation of reflection arrival time caused by variation of the source-to-receiver offset), and are then sorted into common midpoint gathers and stacked to simulate the data trace that would have been recorded by a coincident source and receiver at each midpoint location, but with improved signal-to-noise ratio.

The primary purposes of seismic data processing are to remove or suppress unwanted noise components and to transform the data into seismic sections or images which facilitate interpretation. Examples of well known seismic data processing operations include applying corrections for known perturbing causes, rearranging the data, filtering the data according to a selected criteria, stacking the data, migrating the stacked data to correctly position the reflectors, measuring attributes of the data, and displaying the final result. The particular sequence of processing operations used to process seismic data is dependent on a number of factors such as the field acquisition parameters, the quality of the data, and the desired output.

As is well known in the art, modern seismic data processing operations are performed on digitized data. A digitized seismic data trace is a uniformly sampled time series of discrete measurements of the seismic signal at the receiver in question. A problem known as "aliasing," which is defined as the introduction of frequency ambiguities as a result of the sampling process, can occur in processing digitized data. Where there are fewer than two data samples per cycle, an input signal at one frequency can appear to be another frequency at output. Hence, this problem is best described in the frequency domain where aliased frequencies can be folded (or wrapped) onto other frequencies. To avoid aliasing, frequencies above the folding or Nyquist frequency (which is one-half of the frequency of sampling) must be removed by an anti-alias filter before sampling. For example, for seismic data having a 4 millisecond sampling rate (i.e., a sampling frequency of 250 samples per second), all frequencies above 125 Hertz must be removed in order to avoid aliasing.

Aliasing is an inherent property of all sampling systems. It applies to sampling at discrete time intervals in digital seismic recording, as described above. It can also apply to the spatial distance between individual CMP locations (i.e., spatial sampling). If the spatial sampling interval is too large, certain data processing operations performed in the spatial frequency domain (e.g., dip moveout or DMO) can become spatially aliased. If this happens, events with steep dips can be perceived as different from what they actually are and acquisition noises can be introduced into the processed data.

The problem of spatial aliasing can be particularly acute with respect to a three-dimensional (3-D) marine seismic survey in which multiple sources and/or multiple receivers are used to generate multiple CMP lines on each pass of the seismic vessel resulting in fewer passes (and, consequently, lower cost) to complete the survey. Each of these CMP lines, however, typically has a number of missing shots relative to normal two-dimensional (2-D) data acquisition. These missing shots can cause spatial aliasing during subsequent data processing operations which will degrade the final image.

Spatial aliasing can be avoided by using a sufficiently small trace spacing. This requires either (a) modification of the field recording geometry to include additional sources and/or receivers or (b) use of a data-dependent interpolation scheme to generate extra traces.

Modification of the field recording geometry to generate additional data traces is undesirable because of the added expense that this entails. Therefore, past efforts to avoid spatial aliasing have focused on statistical interpolation techniques to generate additional data traces. One such technique is FX-Wiener interpolation. See, e.g., Spitz, S., "Seismic trace interpolation in the F-X domain," *Geophysics*, Vol. 56, No. 6, June 1991, pp. 785–794. However, this technique has proven to be too unstable for routine use. It is based on least squares matching of the data using a spatially invariant filter. The least squares criterion tends to ignore primary data when a higher amplitude coherent noise is present. The spatial invariance of the filter favors constant dipping reflectors over curved ones, since only constant dipping reflectors are truly predictable using a spatially invariant filter. Also, extrapolation of an event into a gap using FX-Wiener interpolation can produce very high amplitudes if the amplitude of the event is increasing in the direction of the gap.

Many of the flaws of FX-Wiener interpolation are also present in any statistical interpolation technique. The source of the difficulties is relying entirely on the recorded data to predict the missing data. Recorded data are contaminated with coherent and incoherent noises which make signal interpolation or extrapolation difficult.

Another potential method for solving the aliasing problem is based on the work of Vermeer. This method assumes that all data in a common midpoint gather have positive moveout. Hence, in k-space, any data which appear at negative k values were wrapped around from the positive values. If the data are only aliased once, the negative k values can be mapped to their corresponding positive values, effectively halving the spacing in the CMP domain and doubling the aliasing frequency. This approach works well so long as the data are aliased, or wrapped, no more than once. However, this method cannot be used to unwrap data which are aliased (wrapped) more than once.

What is needed is a deterministic interpolation technique which uses knowledge about the underlying wave-propagation theory to interpolate or extrapolate data. The present invention satisfies this need.

SUMMARY OF THE INVENTION

The present invention is a method for reconstructing a seismic wavefield at a designated common midpoint and offset location from a set of prestack seismic data traces obtained from a seismic survey, each of the prestack seismic data traces being a time series of discrete samples of the seismic signal received by a seismic receiver. In one embodiment, the method comprises the steps of (a) selecting the seismic wavefield to be reconstructed; (b) determining the normal moveout velocity of the selected seismic wavefield; (c) selecting a set of input data traces from the prestack common midpoint seismic data traces, the input data traces having common midpoint and offset locations proximate to the designated reconstruction location; (d) performing a normal moveout correction of the input data traces using the normal moveout velocity of the selected seismic wavefield; and (e) generating a reconstructed data trace representative of the selected seismic wavefield at the designated location by mapping each data sample on each of the normal moveout corrected input data traces onto its corresponding location on the reconstructed data trace. The mapping is performed using a reflection point mapping algorithm which transforms data from one offset into any other offset.

In one embodiment of the invention, the set of input data traces comprises data traces that lie horizontally between two diagonal lines in midpoint-offset space defined by the equation $\Delta midpoint = \pm \Delta offset/2$, where $\Delta midpoint$ and $\Delta offset$ are, respectively, the differences between the midpoint locations and the offsets of the input data trace in question and the reconstruction location. The set of input data traces may be further limited by a predetermined maximum $\Delta offset$ which must be at least equal to the pattern number times the receiver interval and, preferably, is an integer multiple of the pattern number times the receiver interval.

In another embodiment of the invention, the set of input data traces is limited to the two actual data traces which (i) fall on the same common midpoint line as the reconstruction location and (ii) are located adjacent to (i.e., on either side of) the reconstruction location. In this embodiment, the reconstructed data trace is generated by copying weighted versions of the two input data traces to the reconstruction location and summing them. Preferably, the weighting is done using cosine weights based on the separations between the input data traces and the reconstruction location. Other weighting methods may be used if desired.

The inventive method may be used to reconstruct both primary wavefields and secondary wavefields, and results in true amplitude reconstructed data traces. If the wavefield being reconstructed is a secondary wavefield, the result may be subtracted from the actual data traces to eliminate interference between wavefields. In this manner, coherent noises (such as water-bottom multiples and peg-leg multiples) may be removed from a data set.

The method may be used to reconstruct data from missing shots in order to prevent spatial aliasing problems during other data processing operations.

BRIEF DESCRIPTION OF THE DRAWINGS

The present invention and its advantages will be better understood by referring to the following detailed description and the attached drawings in which:

FIGS. 1A through 1C are schematic elevation views which illustrate three successive shots from a two-dimensional (2-D) marine seismic survey;

FIGS. 7A, 7B, and 7C illustrate use of the present invention to remove water-bottom multiples from a model data set;

Figure 2:
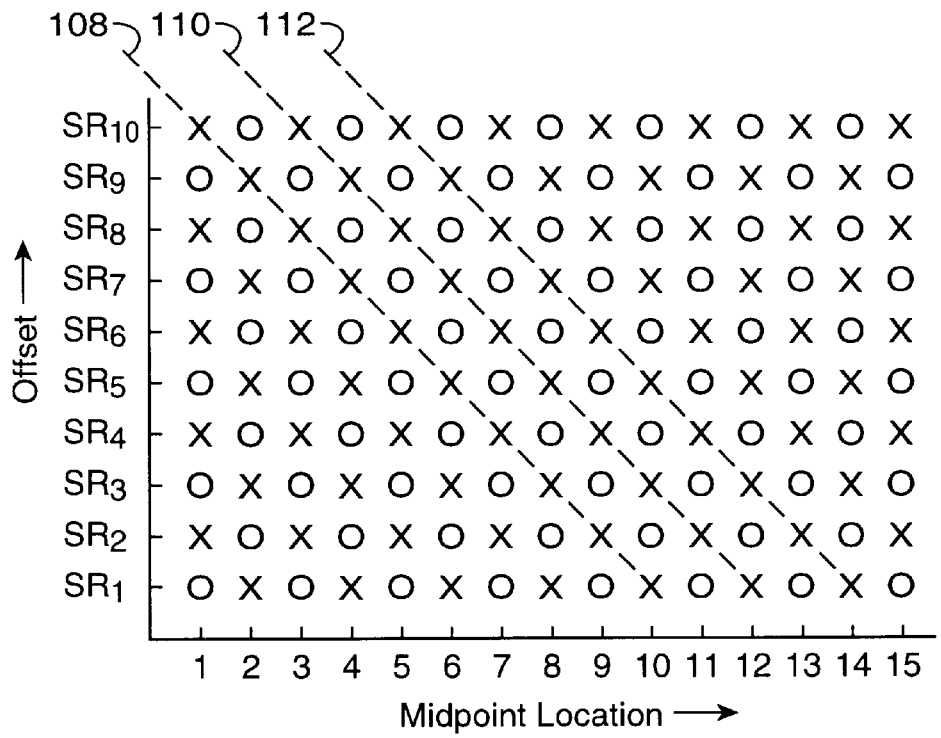
FIG. 2 is a stacking chart for the 2-D marine seismic survey illustrated in FIGS. 1A through 1C.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

Introduction

Before proceeding with the detailed description, a brief discussion of certain seismic data acquisition and processing concepts will be presented to aid the reader in understanding the invention.

FIGS. 1A through 1C illustrate a typical 2-D marine seismic survey in which a seismic vessel 100 tows a single seismic source 102 and an in-line seismic streamer cable 104 containing a plurality of seismic receivers $R_1$ through $R_{10}$. Although only ten receivers are shown for purposes of clarity, persons skilled in the art will understand that actual marine seismic streamer cables may contain hundreds or even thousands of individual receivers.

In FIG. 1A, a first shot $S_1$ is fired by seismic source 102. The resulting seismic signal is received by seismic receivers $R_1$ through $R_{10}$ after being reflected by subsurface seismic reflector 106 which, for purposes of illustration, will be assumed to be a single, horizontal reflector. The seismic signals received by receivers $R_1$ through $R_{10}$ are recorded resulting in a total of ten prestack seismic data traces. According to the CMP method, each of these data traces is assigned to the relevant midpoint location which, for a horizontal reflector, is the reflection point on reflector 106. In other words, the data trace recorded by receiver $R_{10}$ is assigned to midpoint location 1 (the midpoint between shot $S_1$ and receiver $R_{10}$), the data trace recorded by receiver $R_9$ is assigned to midpoint location 2 (the midpoint between shot $S_1$ and receiver $R_9$), and so on.

In FIG. 1B, seismic vessel 100 has advanced a distance equal to the receiver spacing, and a second shot $S_2$ is fired by seismic source 102. The seismic signal is again received by seismic receivers $R_1$ through $R_{10}$ and recorded. In this case, the data trace recorded by receiver $R_{10}$ is assigned to midpoint location 3 (the midpoint between shot $S_2$ and receiver $R_{10}$), the data trace recorded by receiver $R_9$ is assigned to midpoint location 4 (the midpoint between shot $S_2$ and receiver $R_9$), and so on.

In FIG. 1C, the seismic vessel 100 has again advanced a distance equal to the receiver spacing, and a third shot $S_3$ is fired by seismic source 102. In this case the data trace recorded by receiver $R_{10}$ is assigned to midpoint 5 (the midpoint between shot $S_3$ and receiver $R_{10}$), the data trace recorded by receiver $R_9$ is assigned to midpoint 6 (the midpoint between shot $S_3$ and receiver $R_9$), and so on.

Note that the midpoint locations do not move in FIGS. 1A through 1C. This is because these locations represent fixed, geographic locations.

FIG. 2 is a stacking chart for the 2-D marine seismic survey illustrated in FIGS. 1A through 1C. Midpoint locations (which correspond to the midpoint locations shown in FIGS. 1A through 1C) are plotted along the abscissa while the source-receiver offsets are plotted on the ordinate. Source-receiver offset SRI represents the distance between seismic source 102 and receiver $R_1$, offset $SR_2$ represents the distance between seismic source 102 and receiver $R_2$, and so on. In the stacking chart, X's represent offset-midpoint locations that contain a data trace while O's represent offset-midpoint locations without a data trace. All data traces which result from shot $S_1$ are located along diagonal line 108. Similarly, data traces resulting from shots $S_2$ and $S_3$ are located, respectively, along diagonal lines 110 and 112. Data traces from other shots (both before shot $S_1$ and after shot $S_3$) are included in order to fill in the stacking chart.

As will be well known to persons skilled in seismic data processing operations, data traces having the same midpoint location are typically "binned" together for stacking purposes. Therefore, the interval between consecutive midpoints may also be referred to as the "CMP-bin interval."

FIG. 2 illustrates an important quantity of a seismic survey, the "pattern number." The pattern number is defined as the shot interval divided by the CMP-bin interval. Nominally, the CMP-bin interval is half of the receiver interval. If this is true, then $$n_{pattern} = \left| \frac{\Delta x_s}{\Delta x_m} \right| = \left| \frac{2\Delta x_s}{\Delta x_r} \right|,$$

where $n_{pattern}$ is the pattern number, $\Delta x_s$ is the shot interval, $\Delta x_m$ is the CMP-bin interval, and $\Delta x_r$ is the receiver interval. The pattern number is seen in common offset sections or CMP gathers as the period of occurrence of live traces where the period is measured in traces including any missing traces due to the acquisition geometry. A trace is considered missing if within a CMP there is no trace corresponding to one of the nominal offsets recorded with each shot. In FIGS. 1A through 1C, the shot interval was equal to the receiver interval. Therefore, from the above formula, the pattern number is two. This can also be seen in FIG. 2 where the distance between live traces along any common offset (horizontal) line or along any CMP (vertical) line is two traces.

Referring again to FIG. 2, note that the stacking chart (also known as the stack array) is not full. As noted above, the pattern number is 2; therefore, only half of the data required for a full stacking chart is present. This is not necessarily a disaster. These data will alias during stack for wavelengths less than $4\Delta x_r$ (the Nyquist theorem applied to a CMP gather with trace spacing $2\Delta x_r$). However, if after normal moveout (NMO) correction there are no data with wavelengths less than the above value, then no effects of aliasing will be seen on the stacked section.

The pattern number is a key concept in seismic data acquisition and processing. Three reasons for this are:

1. The pattern number is a guide to data processors for predicting fold and offset distribution of stacked sections. Even when prestack migration is performed, the pattern number is used to determine the number of offsets to bin together to produce single-fold common offset bins.
2. The pattern number is a measure of deviation from a full stack array (i.e., where $n_{pattern}=1$ and $\Delta x_m = \Delta x_r / 2$).
3. The pattern number is the minimum number of aliased offsets required to reconstruct a de-aliased offset using the present invention.

Figure 3A:
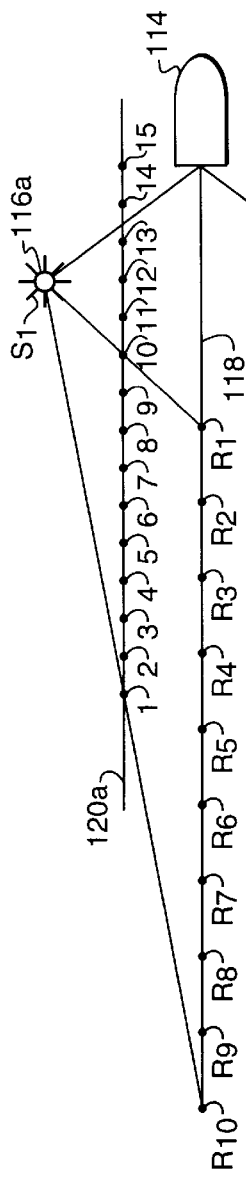
FIGS. 3A through 3C are schematic plan views which illustrate three successive shots from a three-dimensional (3-D) marine seismic survey having dual sources and a single receiver cable.
Figure 3B:
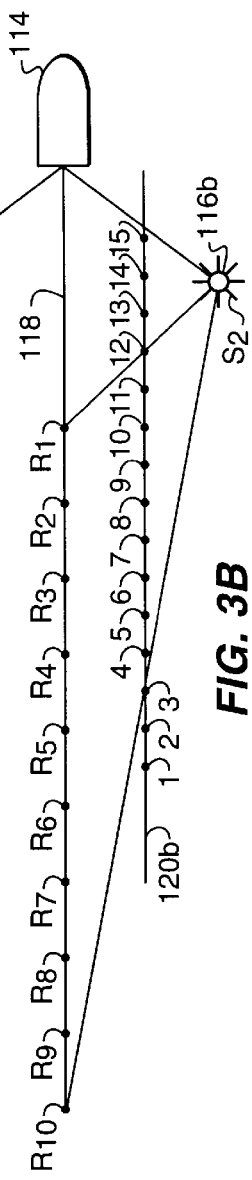
Figure 3C:
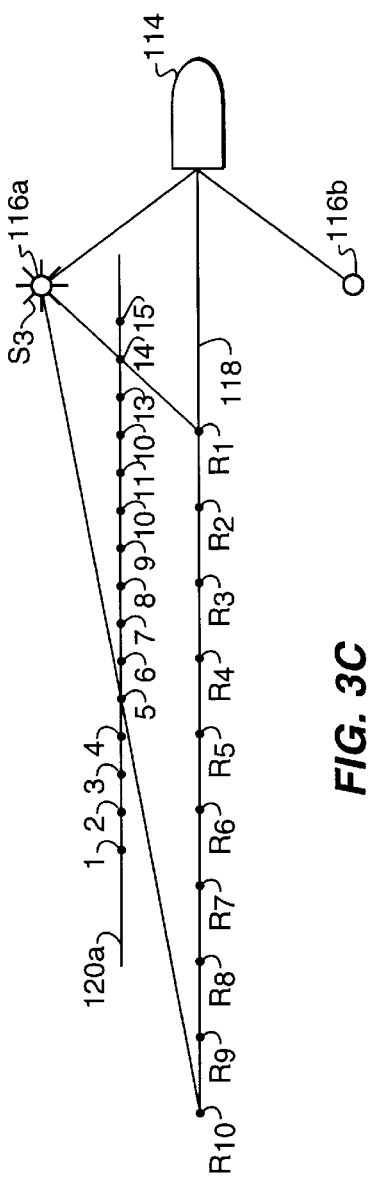

FIGS. 3A through 3C are plan views of a simple 3-D marine seismic survey in which the seismic vessel 114 tows two laterally-offset seismic sources 116a and 116b and one in-line seismic receiver cable 118 containing a plurality of seismic receivers $R_1$ through $R_{10}$. This data acquisition geometry results in acquisition of data traces for two CMP lines 120a and 120b. As is well known in the art, seismic sources 116a and 116b cannot be fired simultaneously as it would be virtually impossible to separate the data generated by source 116a from the data generated by source 116b. Therefore, the dual sources are typically fired at alternating source locations.

In FIG. 3A, source 116a fires a first shot $S_1$ which is received by seismic receivers $R_1$ through $R_{10}$ resulting in a total of ten data traces. These data traces are assigned to midpoint locations on CMP line 120a. In other words, the data trace recorded by receiver $R_1$ is assigned to midpoint location 10 on CMP line 120a; the data trace recorded by receiver $R_2$ is assigned to midpoint location 9 on CMP line 120a; and so on.

In FIG. 3B, the seismic vessel 114 has advanced a distance equal to the receiver spacing and a second shot $S_2$ is fired by the second seismic source 116b. The signal is again received by receivers $R_1$ through $R_{10}$ resulting in ten data traces. In this case, however, these data traces are assigned to midpoint locations on CMP line 120b.

In FIG. 3C, the seismic vessel 114 has again advanced a distance equal to the receiver spacing and a third shot $S_3$ is fired by the first seismic source 116a. The resulting data traces are assigned to midpoint locations falling on CMP line 120a.

From the point of view of imaging, using dual sources doubles the number of CMP lines acquired per pass of the seismic vessel, but halves the fold on each of these CMP lines. For 3-D acquisition, this is considered necessary in order to reduce the time (and, consequently, the cost) required for the survey.

Figure 4:
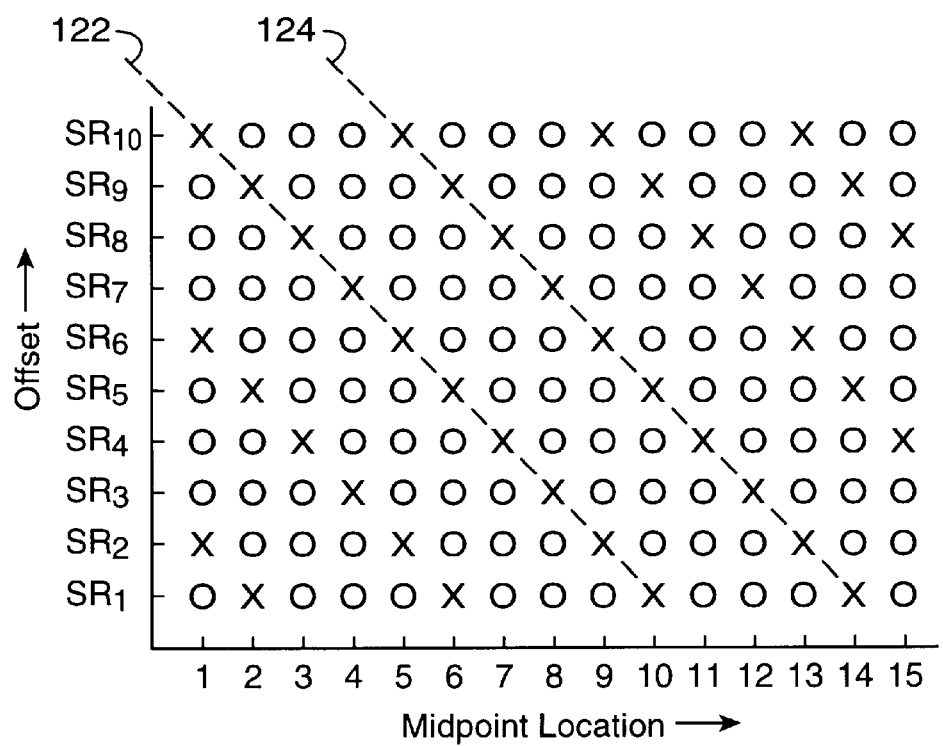
FIG. 4 is a stacking chart for one of the two CMP lines generated by the 3-D marine seismic survey illustrated in FIGS. 3A through 3C.

FIG. 4 is a stacking chart for CMP line 120a. The impact of the dual-source acquisition geometry can be clearly seen in that the chart is only one quarter full. This is because the data generated by the second seismic source 116b are on a different stacking chart (i.e., the one for CMP line 120b) (not shown). Only data from shot $S_1$ (diagonal line 122), data from shot $S_3$ (diagonal line 124), and data from other shots (before $S_1$ and after $S_3$) by seismic source 116a are included in FIG. 4. Also, a given common-offset section or CMP gather in FIG. 4 has a trace every fourth position, since the pattern number for the dual-source acquisition is 4. This low sampling of CMP's can cause problems during stacking operations, and the low sampling of common offsets can cause problems for DMO or prestack migration.

Wavefield Reconstruction

The present invention is a method for reconstructing seismic wavefields. As used herein, a "wavefield" is a component of seismic data which can be represented by a single velocity field with vertical and lateral variations. Typically, seismic data consist of several wavefields (e.g., primary reflections, water-bottom multiples, peg-leg multiples, shear waves, ground roll, etc.) which are described by different velocity fields.

Basically, wavefield reconstruction is spatial interpolation of prestack seismic data using deterministic, wave-equation-based techniques. Spatial interpolation is a way of preventing spatial aliasing during stacking caused by under sampling of data in the imaging domain. As is well known to persons skilled in the art, spatial aliasing occurs when a higher frequency wraps around the folding frequency to a lower frequency due to violation of the Nyquist sampling condition. When a signal is under sampled, one input frequency yields the same output samples as a similar signal at another frequency (i.e., the frequencies are "aliases" of each other).

In wavefield reconstruction, a single designated wavefield is reconstructed from the input data. The designated wavefield can be reconstructed for recorded trace locations, as well as for trace locations which were not recorded. Recorded data from other offsets and CMPs are used in the reconstruction. If the reconstructed wavefield is a secondary wavefield (i.e., not the primary wavefield of interest), it can be subtracted from the recorded traces in order to remove interference between wavefields. Wavefield reconstruction may be used to reconstruct missing data in both 2-D and 3-D seismic data.

Wavefield reconstruction has been found to be particularly effective for attenuation of high amplitude water-bottom or peg-leg multiples which obscure primary reflections of interest. First, the multiple wavefield is reconstructed and subtracted from the recorded data. Then, the primary wavefield is reconstructed from these almost multiple-free input data. The primary reconstruction further attenuates the contribution of multiples and other unwanted wavefields.

Wavefield reconstruction is deterministic, so it is robust in the presence of high amplitude coherent noise. It is based on wave propagation theory and properly handles dipping reflectors, curved reflectors, and diffractions. Moreover, wavefield reconstruction can de-alias data that are severely aliased (i.e., wrapped more than once). The deterministic nature of wavefield reconstruction also leads to computational efficiency since the operator that interpolates the data is predetermined.

The wavefield reconstruction technique is based in part on a 1987 paper by Ronen (Ronen, J., "Wave-equation trace interpolation," *Geophysics*, Vol. 52, No. 7, July 1987, pp. 973–974). Ronen demonstrated that DMO could be used to connect data collected at different offsets with sampling theory to unravel aliasing due to under sampling of the individual offsets. Ronen's theory, however, deals only with de-aliasing of the final stacked image, and it uses a DMO operator that does not preserve amplitudes. Further, Ronen made an erroneous assumption concerning how seismic data are collected. The wavefield reconstruction technique extends Ronen's theory by deriving an operator that preserves amplitudes and applying the technique to prestack data.

The wavefield reconstruction technique is also based in part on a 1993 paper by Black et al. (Black, J. L., Schleicher, K. L., and Zhang, L., "True-amplitude imaging and dip moveout," presented at the 58th Annual International Meeting of the Society of Exploration Geophysicists, 1993). Black et al. discuss a theory for true amplitude DMO. This theory was developed assuming that each of the offsets is perfectly sampled, and Black et al. do not address any aliasing which can result from sparse sampling. The wavefield reconstruction technique expands on the Black et al. theory by converting data from any offset into any other offset.

The mathematical basis of wavefield reconstruction is extremely complex, and a full understanding of the underlying mathematics is not necessary in order to practice the invention. Nevertheless, a detailed theoretical development of the mathematics of wavefield reconstruction, as they are currently understood, is set forth in the Appendix below so that interested persons can more fully understand the theoretical basis of the invention.

It will be immediately apparent to persons skilled in the art that the present invention should preferably be practiced using a digital computer. Any such person could readily develop computer software for performing the wavefield reconstruction method based on the teachings set forth herein.

The following detailed description will illustrate application of wavefield reconstruction in the context of a marine 3-D seismic survey. It should be understood, however, that wavefield reconstruction may be used to reconstruct seismic wavefields in any type of seismic data. For example, wavefield reconstruction could be used to reconstruct missing data traces in a land-based seismic survey caused by faulty receivers or topographic obstructions. Accordingly, to the extent that the following detailed description is specific to a particular embodiment or a particular use of the invention, this is intended to be illustrative and is not to be construed as limiting the scope of the invention.

Figure 5:
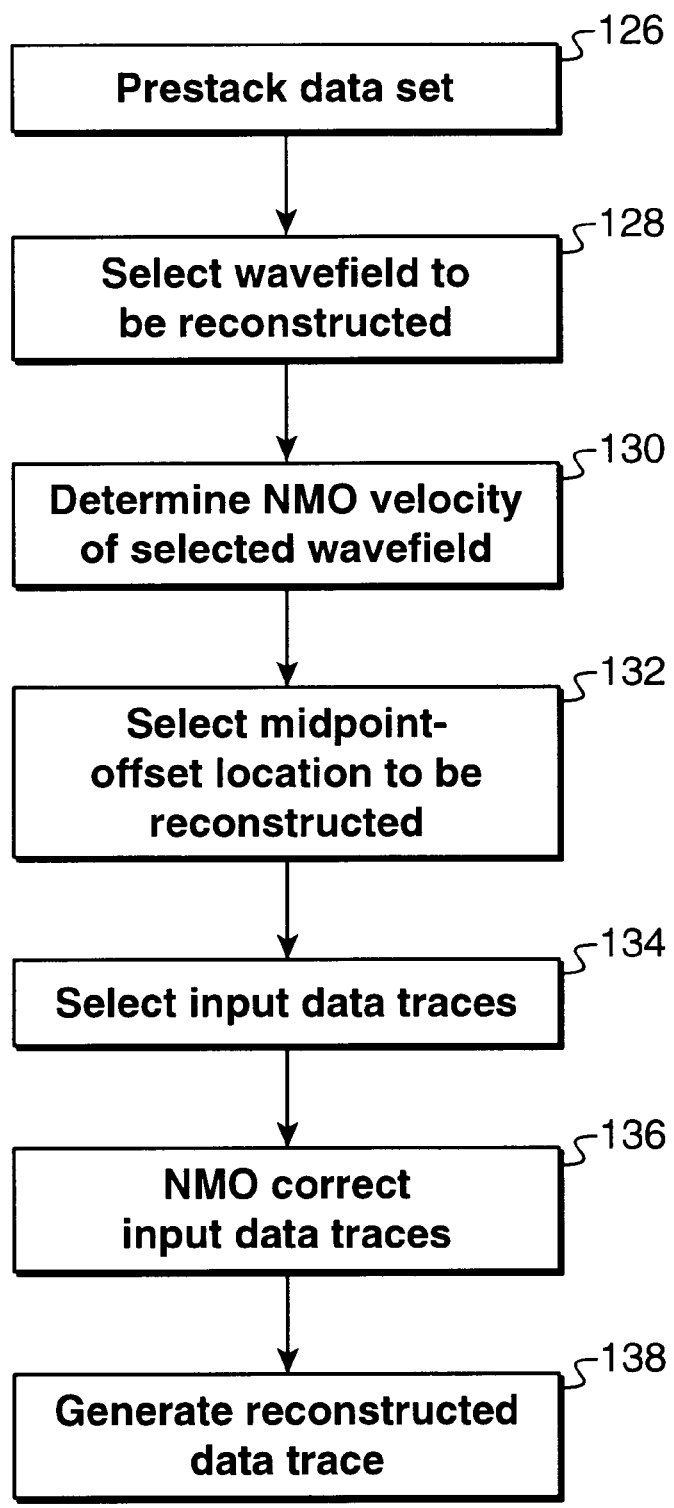
FIG. 5 is a flowchart illustrating the various steps used in implementing one embodiment of the present invention.

FIG. 5 is a flowchart illustrating one embodiment of the wavefield reconstruction invention. The inventive method begins with a prestack seismic data set 126. As noted above, this data set may be any type of seismic data.

The first step of the method is to select the seismic wavefield to be reconstructed (reference numeral 128). This wavefield may be either a primary wavefield or a secondary wavefield such as a water-bottom multiple wavefield. If more than one wavefield is to be reconstructed, then the method should be repeated for each selected wavefield.

The normal moveout (NMO) velocity of the selected wavefield is then determined (reference numeral 130). Techniques for determining the NMO velocity of the selected wavefield are well known in the art and will not be further described herein.

The wavefield reconstruction method operates in midpoint-offset space. In other words, the method will reconstruct the selected wavefield at a specific common midpoint and offset location. Therefore, the next step of the method is to select the midpoint-offset location to be reconstructed (reference numeral 132). Persons skilled in the art will understand that step 132 could be performed prior to the selection of the wavefield to be reconstructed (step 128) without adversely affecting the results obtained. Accordingly, such reversed order will be deemed to be within the scope of the invention.

The input data traces to be used in the reconstruction are selected at step 134. As the input traces become more and more remote from the reconstruction location, their effect on the reconstructed trace becomes smaller and smaller. Therefore, the selected traces preferably should be reasonably proximate to the midpoint-offset location to be reconstructed. If possible, the selected data traces should be located within a window of midpoint-offset locations centered at the reconstruction location.

Ideally, the midpoint-offset location to be reconstructed should be surrounded by actual data traces that are used for the reconstruction. As noted above, the minimum number of midpoints and offsets needed for the reconstruction is equal to the pattern number. If larger windows are used, the reconstructed trace should be scaled by the pattern number divided by the number of offsets used for the reconstruction. In general, it is preferable to use an integer multiple of the pattern number for the number of input offsets. In other words, preferably $$|\Delta \text{offset}|_{max} = C n_{pattern} \Delta x_r,$$

where $|\Delta \text{offset}|_{max}$ is the maximum difference in offsets between any input data trace and the reconstruction location, C is a positive integer, $n_{pattern}$ is the pattern number, and $\Delta x_r$ is the receiver interval.

Once the range of midpoints and offsets to be used in the reconstruction has been selected, only a restricted portion of the data in the window contribute to the reconstruction. With the origin at the reconstruction location, the equation $\Delta \text{midpoint} = \pm \Delta \text{offset}/2$ defines two diagonal lines in the midpoint-offset space. Only data traces that lie horizontally between these two diagonal lines contribute to the reconstruction. In other words, the input data traces to be used for the reconstruction will satisfy the following equation:

$$|\Delta \text{midpoint}| \leq \frac{|\Delta \text{offset}|}{2},$$

where $|\Delta \text{midpoint}|$ is the difference in midpoint locations between the input data trace in question and the reconstruction location and $|\Delta \text{offset}|$ is the difference in offsets between the input data trace in question and the reconstruction location.

Figure 6:
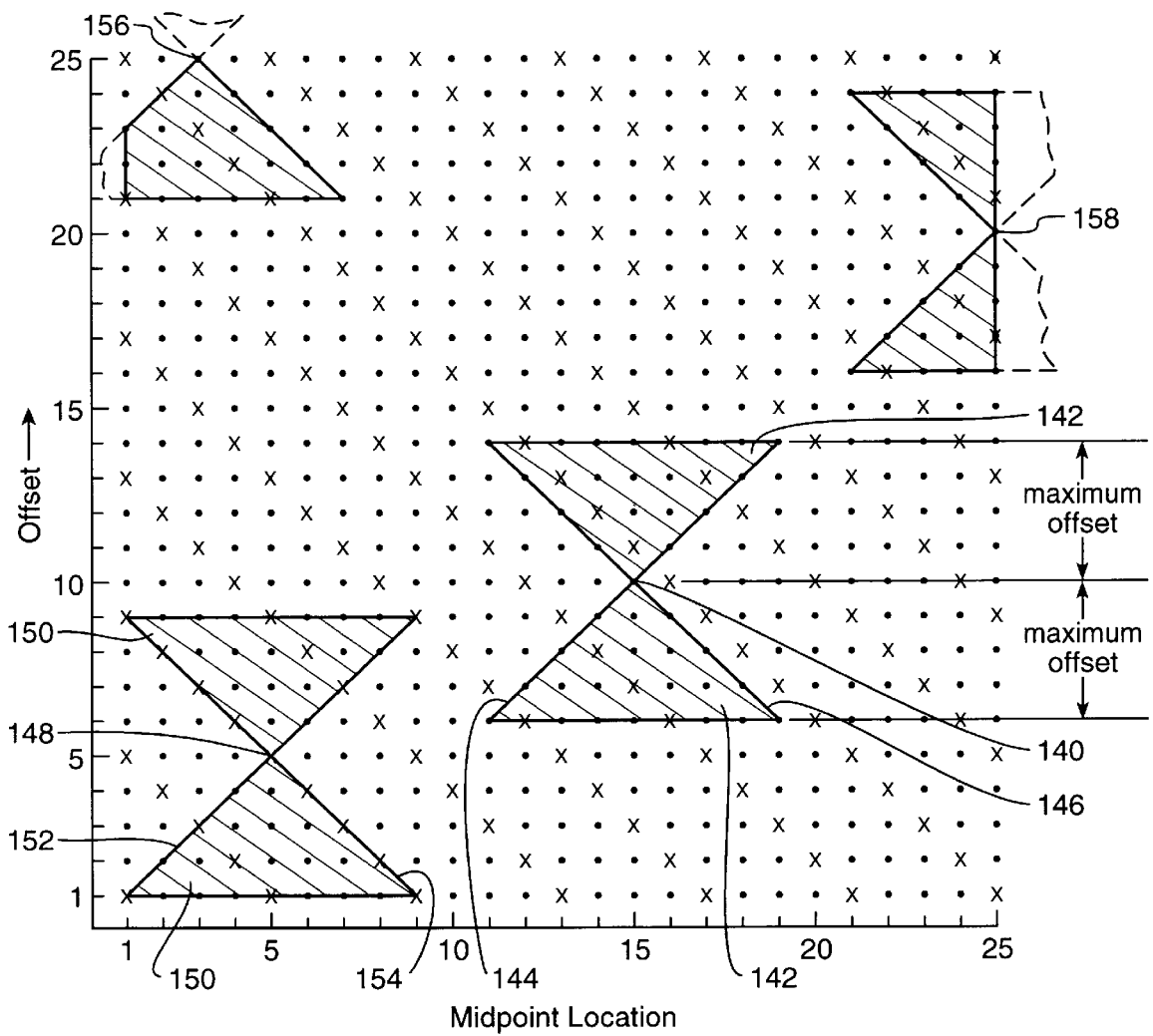
FIG. 6 illustrates application of one embodiment of the present invention in connection with a dual source, single receiver cable 3-D marine seismic survey.

These concepts are illustrated in FIG. 6 which is a stacking chart for a dual source, single receiver cable marine 3-D seismic survey. As described above, the pattern number for this type of survey is 4. For purposes of illustrating the invention, a total of 25 midpoints and 25 offsets are shown in the stacking chart, although persons skilled in the art will understand that a 3-D marine seismic survey typically contains many more midpoints and offsets than are shown in FIG. 6. The midpoints and offsets are numbered from 1 to 25 for convenience. The X's indicate midpoint-offset locations that contain actual data traces.

Assume that it is desired to reconstruct a selected wavefield at the (15,10) midpoint-offset location (reference numeral 140). The input traces for this reconstruction are the traces which fall into the hourglass-shaped area 142 centered at reconstruction location 140. Thus, the input data set for the reconstruction will consist of the ten data traces having midpoint-offset locations of (12,6), (16,6), (15,7), (14,8), (15,11), (14,12), (13,13), (17,13) (12,14), and (16,14). Hourglass-shaped area 142 is defined by (i) a preselected maximum $\Delta$offset which, as noted above, must be at least equal to the pattern number times the receiver interval and, preferably, is an integer multiple of the pattern number times the receiver interval and (ii) the two diagonal lines 144 and 146 which satisfy the $\Delta \text{midpoint} = \pm \Delta \text{offset}/2$ equation. In FIG. 6, the pattern number is 4 and the integer multiplier is 1.

In actual data processing operations, the integer multiplier typically falls between 3 and 10, although larger or smaller multipliers may be used if desired. If the integer multiplier is greater than 1, then the output of the reconstruction should be divided by the multiplier in order to preserve the amplitudes of the data.

The wavefield reconstruction technique may be used to reconstruct both missing data traces and actual data traces. Assume that it is desired to reconstruct the water-bottom multiple wavefield for the actual data trace at the (5,5) midpoint-offset location (reference numeral 148). In this case, data traces falling in the hourglass-shaped area 150 would be used to reconstruct the desired wavefield, except that the actual data trace at the reconstruction location (5,5) should not be used. Area 150 would be defined in the same manner as described above for area 142. If desired, traces falling on diagonal lines 152 and 154 can be ignored.

At the extremes of offset or midpoint it is not possible to symmetrically surround the reconstruction location with actual data traces. For example, when reconstructing a wavefield at the (3,25) midpoint-offset location (reference numeral 156) or the (25,20) midpoint-offset location (reference numeral 158), it is not possible to use a full hourglass-shaped area since it would extend beyond the edges of the stacking chart. For this reason, the accuracy of the reconstruction near the edges of the stacking chart is less than ideal. Nevertheless, the results obtained near the survey edges appear to be quite acceptable.

Returning now to FIG. 5, after the input data traces have been selected (step 130), they must be normal moveout (NMO) corrected (step 136) using the NMO velocity of the wavefield to be reconstructed (step 130). The NMO-corrected input traces are then used to generate a reconstructed data trace at the reconstruction location (step 138), using a reflection point mapping technique which will be described below. The reconstructed data trace represents the selected wavefield at the reconstruction location.

In many cases, it may be desired to reconstruct a wavefield at all or a large portion of the trace locations in the survey. For example, assume that it is desired to remove water-bottom multiples from the data shown in FIG. 6 and to generate reconstructed traces at all of the vacant midpoint-offset locations so that subsequent data processing operations will not be subject to spatial aliasing. The first step would be to reconstruct the water-bottom multiple wavefield (using the NMO velocity of the water-bottom multiples) at all of the actual trace locations (X's) in FIG. 6. The resulting water-bottom multiple traces are then subtracted from the actual traces to obtain nearly multiple-free data traces. Next, the primary wavefield is reconstructed (using the NMO velocity of the primary reflections) at all of the vacant midpoint-offset locations using the multiple-free data traces as inputs to the reconstruction. It may be desirable to use a median filter (or other signal processing technique) to suppress any residual primary reflections after the multiples reconstruction so that no primary reflections are deleted when the multiples are subtracted from the actual data traces. This process results in an almost multiple-free data set with a full stack array.

The reconstructed data trace is generated by mapping each data sample on each of the NMO-corrected input data traces onto its corresponding location on the reconstructed data trace. Initial development of the wavefield reconstruction theory led to the following mapping algorithm:

$$P(t_m, y_m, h_m) = G[d_{1/2}(\text{sign}(h_m - h_n)t_n)P(t_n, y_n, h_n)],$$

where $P(t_m, y_m, h_m)$ is the data sample at a given time, midpoint, and half offset on the reconstructed data trace (half offsets are preferably used in order to make the equation symmetric), $P(t_n, y_n, h_n)$ is the input data sample at a given time, midpoint, and half offset being mapped onto the reconstructed data trace, $$G = g \left[ \frac{2A_n^2(k_s) - 1}{A_n^3(k_s)} \frac{A_m^3(k_s)}{2A_m^2(k_s) - 1} \frac{t_m^{1/2}}{\sqrt{4\pi h_m (h_n - h_m)} \left[ 1 - \frac{(y_m - y_n)^2}{(h_m - h_n)^2} \right]^{3/4}} \right],$$

$$d_{1/2}(\text{sign}(h_m - h_n)t_n) = \frac{1}{2\pi} \int d\omega_m (\text{sign}(h_m - h_n)j\omega_m)^{1/2} e^{-j\omega_m t_n},$$

g is a constant multiplier empirically determined from model data which is used to scale the amplitude of the data sample on the reconstructed data trace, $$j = \sqrt{-1},$$

$$k_s = \frac{t_m \omega_m}{2h_m} \sqrt{\frac{(y_m - y_n)^2}{(h_m - h_n)^2 - (y_m - y_n)^2}}$$

The time of the input data sample $t_n$ may be related to the time of the reconstructed data sample tm according to the following equation:

$$t_n = t_m \sqrt{\frac{h_n}{h_m}} \sqrt{1 - \frac{h_n - h_m}{h_n} \sqrt{1 - \left(\frac{y_m - y_n}{h_n - h_m}\right)^2}}.$$

Alternatively, the time of the input data sample $t_n$ may be related to the time of the reconstructed data sample $t_m$ according to the following equations:

$$\text{if } h_m > h_n, \text{ then } t_n = t_m \frac{\sqrt{\frac{U+V}{2}}}{|h_m|}, \text{ or}$$

$$\text{if } h_n > h_m, \text{ then } t_n = t_m |h_n| \sqrt{\frac{2}{U+V}},$$

where $$U = h_n^2 + h_m^2 - (y_m - y_n)^2 \text{ and}$$

$$V = \sqrt{U^2 - (2h_n h_m)^2}.$$

The above algorithm is applied to each data sample on the input data trace, and then to each data sample on all of the other input data traces. The results are scaled (by the "G" factor of the mapping algorithm) and then summed to generate the reconstructed data trace.

Subsequent mathematical development of the wavefield reconstruction theory (see the attached Appendix) has led to a slightly modified mapping algorithm which is set forth in equation (120) of the Appendix and accompanying text. Use of either the mapping algorithm set forth above or the modified mapping algorithm set forth in equation (120) of the Appendix produces acceptable results. Persons skilled in the art may be able to generate other modified algorithms which also produce acceptable results. Such algorithms shall be deemed to be within the scope of the present invention to the extent that they generate a reconstructed data trace by mapping each data sample on each of the NMO-corrected input data traces onto its corresponding location on the reconstructed data trace.

Offset-Borrowing Reconstruction

Offset-borrowing reconstruction is an inexpensive approximation to wavefield reconstruction which may be used with either 2-D or 3-D seismic data. In offset-borrowing reconstruction, only two input data traces are used in the reconstruction. These two input traces are (i) the trace having the same midpoint and the nearest offset greater than the reconstruction location and (ii) the trace having the same midpoint and the nearest offset less than the reconstruction location. In other words, the two input traces and the reconstruction location all fall on the same midpoint (vertical) line in a stacking chart (e.g., FIG. 6), and the input traces used in the reconstruction are the nearest traces above and below the reconstruction location.

In offset-borrowing reconstruction, the reconstructed trace is generated by simply copying weighted versions of the two input traces (after NMO correction) to the reconstruction location and summing them. Preferably, differences in offset distribution are handled by tapering the interpolation using cosine weights based on the separation between the input traces. The weight starts at a value of one at the input trace location in question and tapers down to a value of zero at the other input trace location. Following the reconstruction, the NMO correction is removed and the reconstructed data trace may then be used just like an actual data trace in subsequent data processing operations.

Offset-borrowing reconstruction is preferably used in conjunction with DMO to remove secondary wavefields (e.g., water-bottom multiples) and eliminate aliasing problems. First, offset-borrowing reconstruction is used to reconstruct the secondary wavefield. Then, DMO is applied to reconstruct the primary wavefield. This procedure produces a nearly continuous secondary wavefield which does not alias during stack. In this procedure, stack is the process which attenuates the secondary wavefield.

The offset-borrowing reconstruction process, however, can have an adverse impact on the primary reflections, especially those with higher frequencies. This occurs because the NMO process causes time shift errors which distort the primaries. The high frequencies are affected most, since a time shift error corresponds to a larger fraction of the wavelength for higher frequencies. The primary reflections can be protected by using a muting process based on the following equation:

$$t_{NMO} = C_{mute} \left| f_{max} h \Delta h \left( \left( \frac{\cos\alpha}{V} \right)^2 - \frac{1}{V_{NMO}^2} \right) \right|,$$

where $t_{NMO}$ is the arrival time after NMO, $C_{mute}$ is a constant typically equal to 8, $f_{max}$ is the maximum frequency which is still in phase (i.e., within half a cycle) after NMO, h is the offset of the input data trace, $\Delta h$ is the change in offset between the input data trace and the reconstruction location, α is the angle of reflector dip, V is the primary root-mean-square (RMS) velocity, and $V_{NMO}$ is the normal moveout velocity of the selected wavefield. The above equation yields a minimum arrival time for given $f_{max}$, $x_h$, $\Delta x_h$, dip, and velocities which will still have primary energy in phase during the reconstruction. Times earlier than this time will add primary energy out of phase. This can only be prevented by turning off the interpolation for these earlier times, which leaves the reconstructed trace muted down to the time given by the above equation.

EXAMPLE 1

This example illustrates the use of wavefield reconstruction to remove water-bottom multiples from a model data set. FIG. 7A shows a CMP gather for the model before wavefield reconstruction. The model data set had 135 traces per record, a station spacing of 25 meters, a shot spacing of 25 meters, and the near trace at 335 meters. Shots were consecutively numbered to be consistent with 25 meter spacing and can be selected on input to simulate a larger shot spacing. There are three primaries at one, two, and three seconds with a peak amplitude of unity. The velocities for these primaries are 1700, 2000, and 2500 meters per second, respectively. Each of these primaries is covered by water-bottom multiples having an identical velocity of 1480 meters per second. The first primary is covered by multiples starting at 0.8, 0.9, and 1.0 seconds; the second primary has interference from multiples starting at 1.5, 1.6, 1.7, 1.8, 1.9, and 2.0 seconds; and the third primary is covered by multiples starting at 2.5, 2.6, 2.7, 2.8, 2.9, and 3.0 seconds. The model has a multiple-to-primary amplitude ratio of two-to-one.

FIG. 7B shows the same gather after wavefield reconstruction to remove the water-bottom multiples. The wavefield reconstruction processing was accomplished using a shot spacing of 75 meters (i.e., three times the shot spacing of the original model) while 49 offsets and CMP's were used for the reconstruction. The model was processed first to reconstruct the multiples (starting with shot 1). When the multiples were reconstructed a median filter was applied to smooth the multiple estimate and further eliminate any residual primary. This reconstruction and median filter procedure was then repeated two more times starting on shot 2 and shot 3, respectively, so that all shots were included in the reconstruction. Then the three output data sets were averaged together. This average result was then subtracted from the input data, and the resulting data set was used as the input for primary reconstruction. The primaries were also reconstructed three times so that all the data were used. No median filter was used after reconstruction of the primaries. These results were averaged to give the results seen in FIG. 7B. It can be clearly seen that the water-bottom multiples have been virtually eliminated from the model data set. A small amount of residual energy from the multiples is visible at the near offsets. This is the result of a lack of moveout differences at small offsets.

Figure 7C:
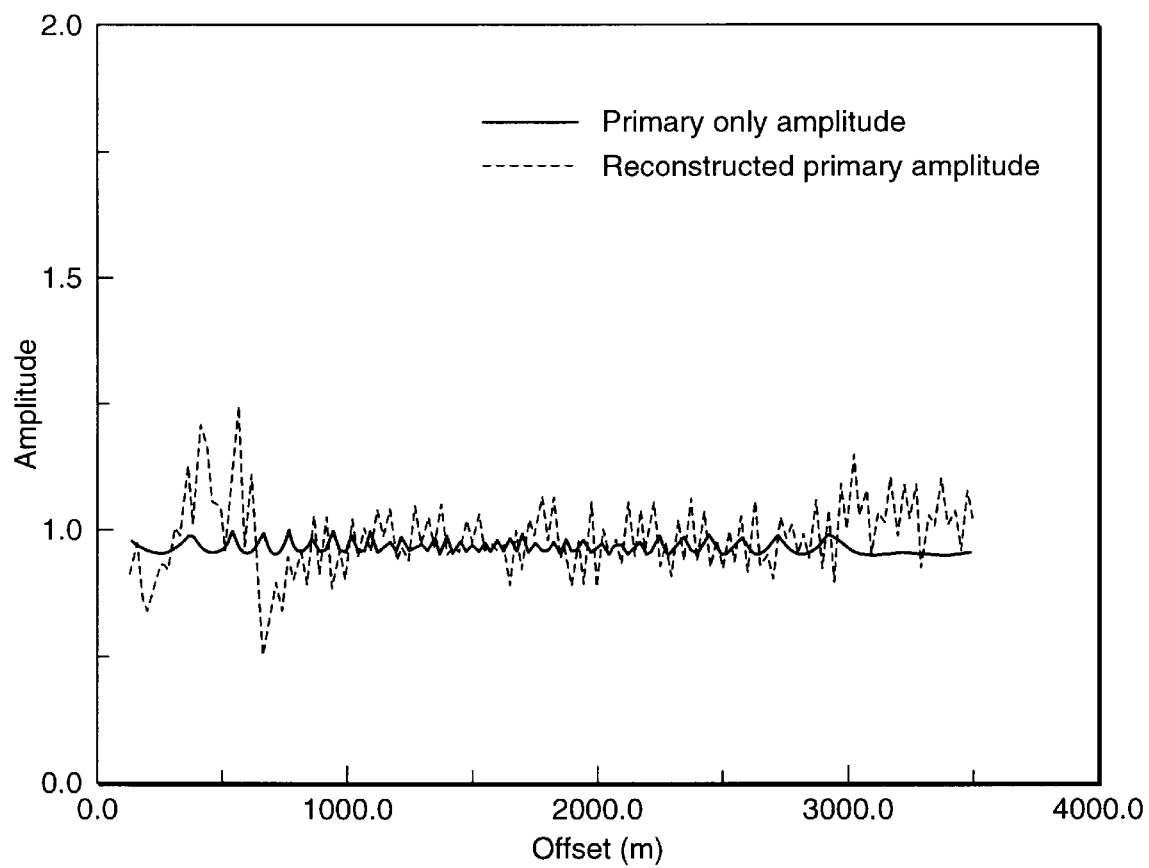

The wavefield reconstruction technique preserves the amplitudes of the reconstructed data. This is illustrated in FIG. 7C which is a plot of amplitude with offset for the reflector at 3.0 seconds in FIGS. 7A and 7B. The solid line shows the true peak primary amplitudes and the dotted line shows the reconstructed primary amplitudes. Little error can be seen except at near offsets where the NMO correction is less effective in separating the primary energy from the multiple energy.

EXAMPLE 2

This example illustrates the use of both wavefield reconstruction and offset-borrowing reconstruction on an actual marine seismic data set. FIG. 8A shows an original CMP gather from a marine seismic survey. The first water-bottom multiple is seen at just below 3.6 seconds, and a subsequent water-bottom multiple is also apparent in the gather, as indicated by the arrows. The water-bottom multiples and peg-leg multiples were very apparent during velocity analysis, and two reconstructions were necessary to remove them from the data. Two reconstructions were needed because the water-bottom multiples and peg-leg multiples have different NMO velocities, and wavefield reconstruction reconstructs a single wavefield having a specified NMO velocity. One reconstruction was made for the slower water-bottom multiples, and one for the faster peg-leg multiples. Only one-third of the data were used for the reconstruction (to simulate sparse sampling), and the results of these two reconstructions were subtracted from the input data prior to the primary reconstruction. These data had 120 channels, 25 meter station separation, and a near trace at 106 meters. The shot spacing was 25 meters, but 75 meter shot spacing was used when reconstructing both the multiples and the primaries (again, to simulate sparse sampling). In addition, 49 offsets and CMP's were used in all the reconstructions.

Figure 8B:
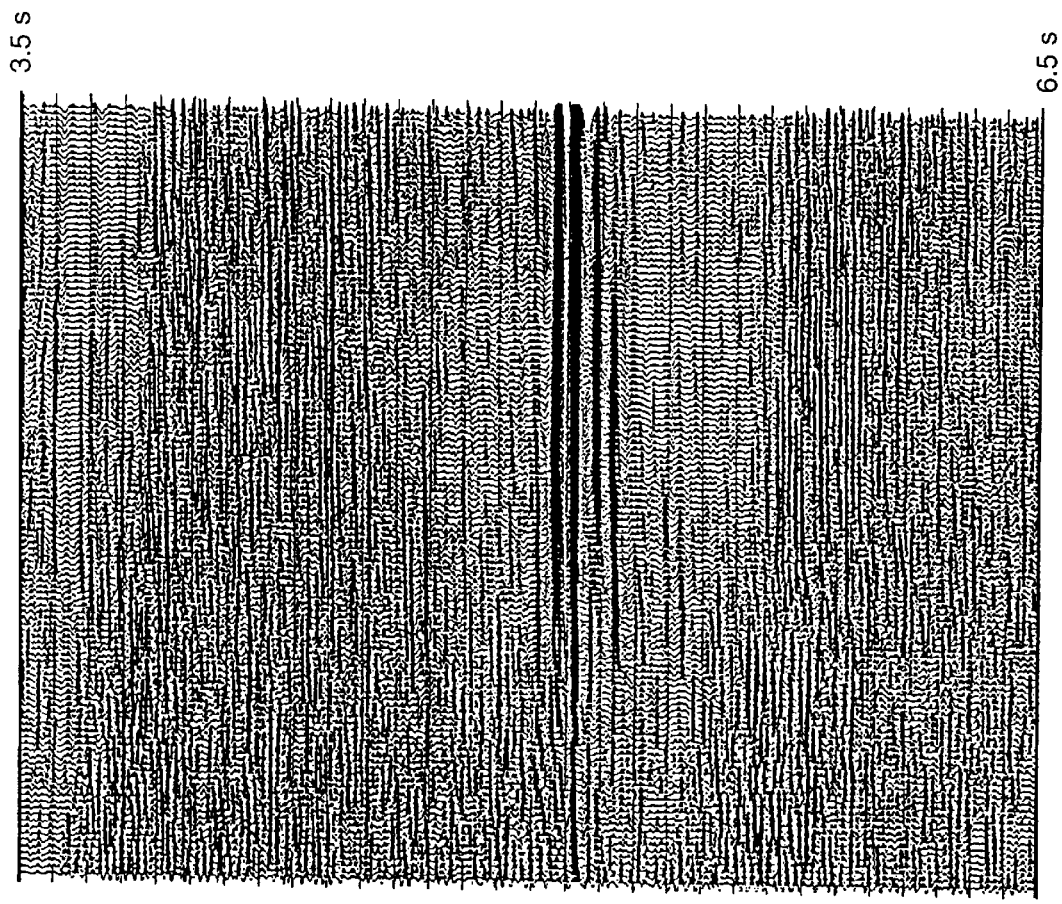
FIGS. 8A and 8B illustrate a CMP gather from a marine seismic survey before and after, respectively, application of the present invention.
Figure 8A:
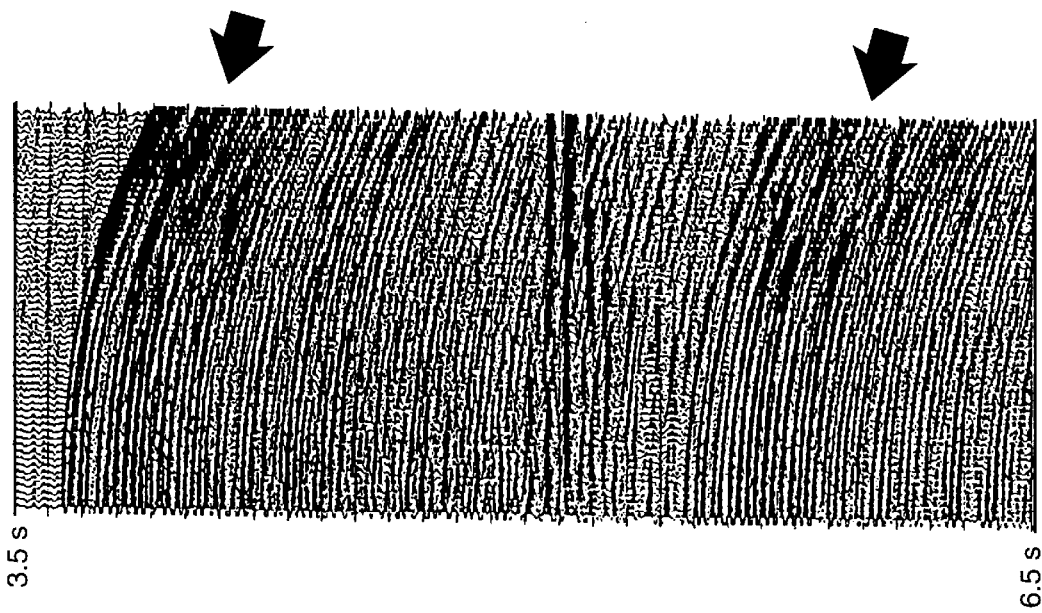

FIG. 8B shows the reconstructed CMP gather. There has been a dramatic improvement compared with the original CMP gather (FIG. 8A). Note that the reconstructed gather has more traces in the gather since all the shots are present in the reconstructed gather. This improvement is so dramatic that stacked results were obtained for this data set.

Figure 9:
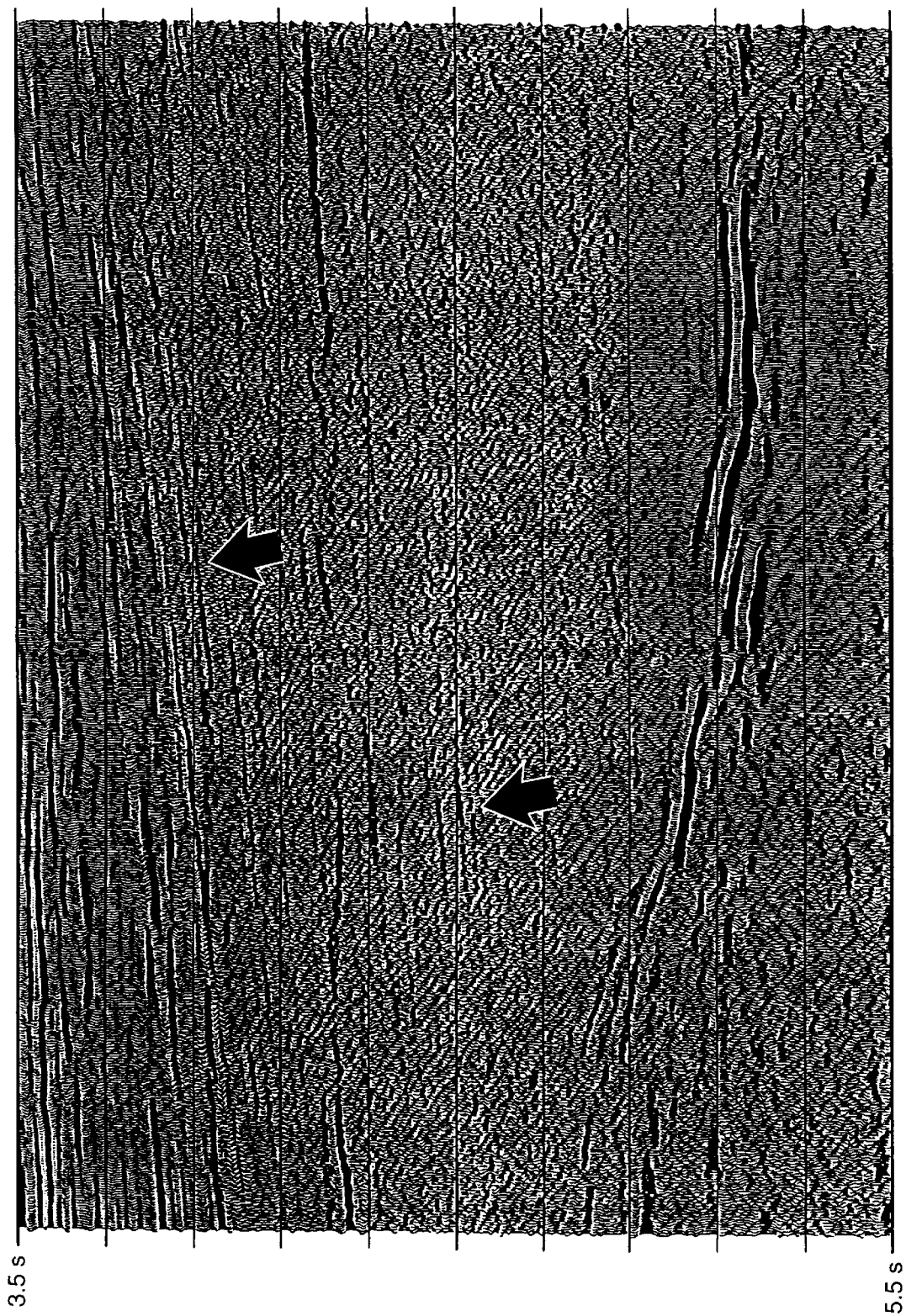
FIG. 9 is a brute stack of data from one CMP line of a marine seismic survey.
Figure 10:
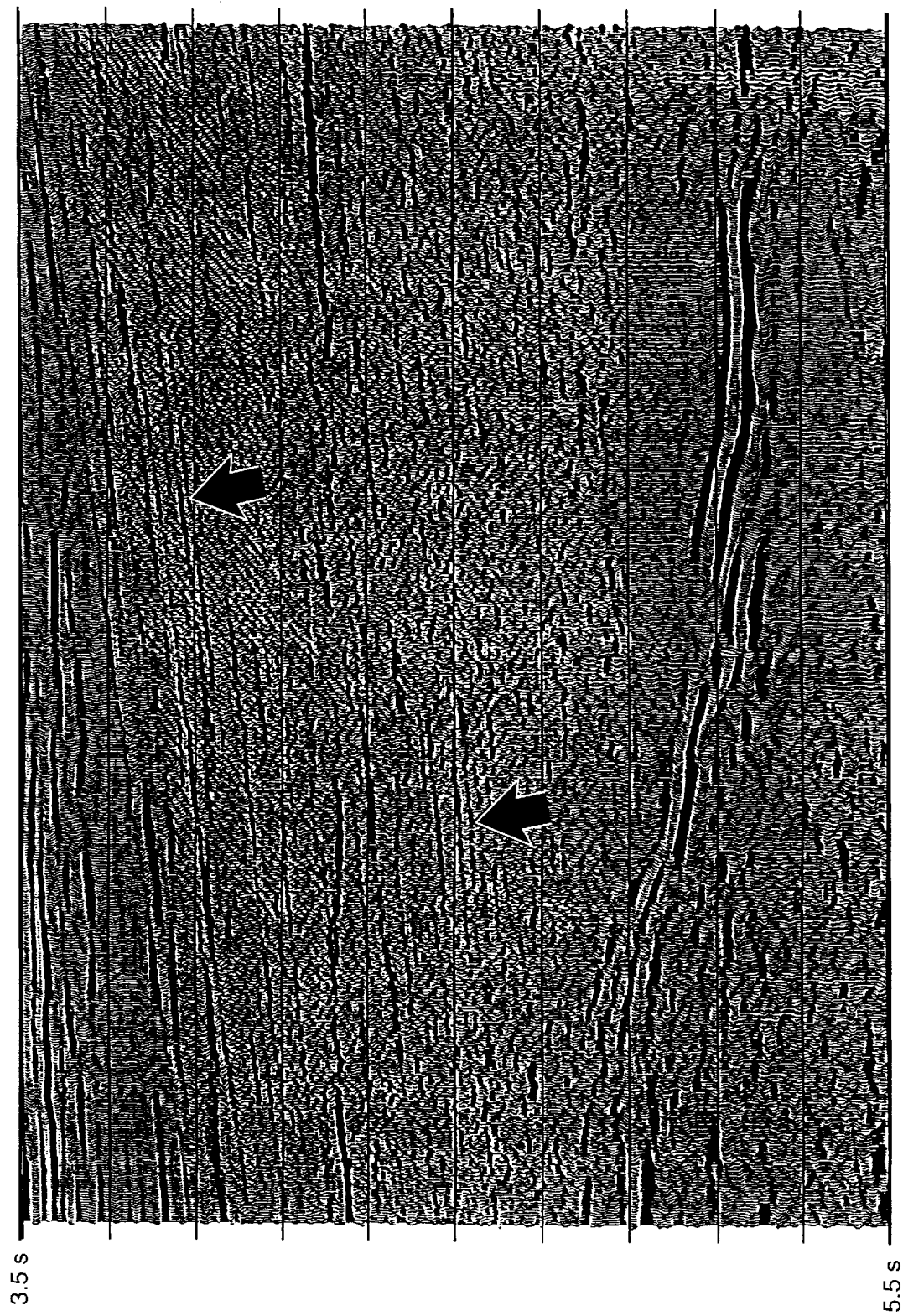
FIG. 10 illustrates the results obtained when one-third of the data for the CMP line of FIG. 9 is processed using offset-borrowing reconstruction.
Figure 11:
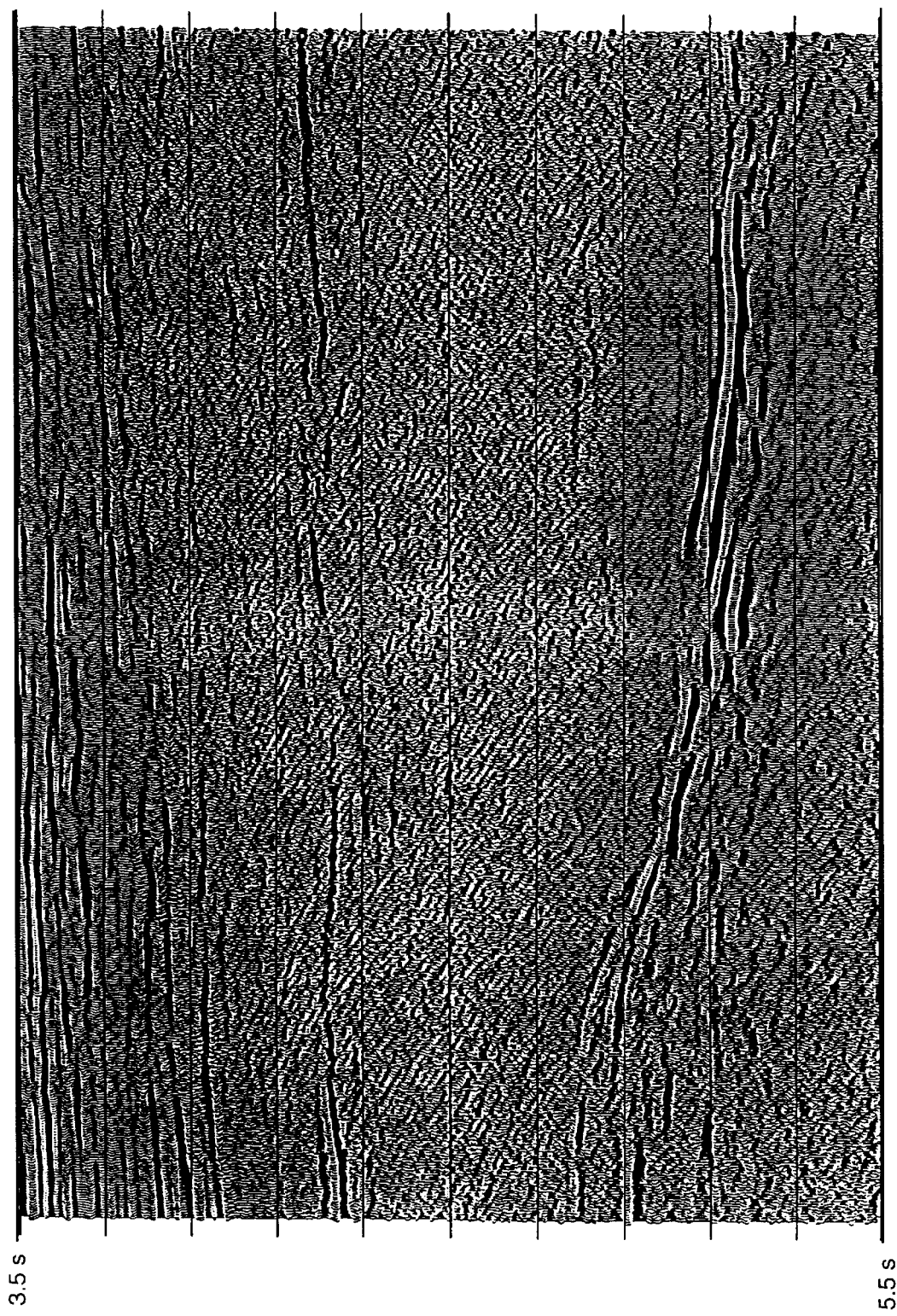
FIG. 11 illustrates the results obtained when one-third of the data for the CMP line of FIG. 9 is processed using wavefield reconstruction.

FIGS. 9 through 11 show how effectively the stacked image has been improved via wavefield reconstruction. FIG. 9 shows the brute stack with a 25 meter shot spacing. The residual water-bottom multiples can be seen as dipping events running across the section, as indicated by the arrows. FIGS. 10 and 11 show stacks using offset-borrowing reconstruction and wavefield reconstruction, respectively. The offset-borrowing reconstruction (using a 75 meter shot interval) did exactly what it is supposed to do—it provided a stack that looks like the brute stack in FIG. 9 which had a 25 meter shot interval. Offset-borrowing reconstruction does not remove the multiples which can be clearly seen in FIG. 10. The wavefield reconstruction stack (FIG. 11) appears to be almost multiple free. Thus, it is clear that wavefield reconstruction is an effective way to remove multiples from sparsely sampled input data.

Persons skilled in the art will understand that wavefield reconstruction and offset-borrowing reconstruction are extremely versatile and may be used in a variety of ways and for a variety of purposes. Further, it should be understood that the invention is not to be unduly limited to the foregoing which has been set forth for illustrative purposes. Various modifications and alternatives will be apparent to those skilled in the art without departing from the true scope of the invention, as defined in the appended claims.

Appendix

This Appendix sets forth a detailed theoretical development of full wavefield reconstruction. It will be assumed that the reader has a basic understanding of seismic data processing, including the problem of spatial aliasing, and is familiar with the relevant signal processing literature.

The conventional teaching within the seismic industry is that aliasing is an irreversible process which must be prevented by anti-aliasing filtering before sampling. This is true for individual aliased signals, but redundant aliased signals can be dealiased under the right circumstances.

If equations can be written which describe a set of recorded signals as a linear function of a set of desired signals, and the set of equations is invertible, then the desired signals can be obtained as a linear function of the recorded signals. Spatial aliasing is a particular example of a linear filter. Note that aliasing is linear but not space invariant, and hence cannot be represented as a multiplication in the Fourier domain.

In the following sections we will first develop the mathematics of aliasing. Then we will develop a linear relationship between various offsets using DMO theory. Finally, the wavefield reconstruction equations will be constructed and solved.

Seismic Wavefield Aliasing

In general, uniform sampling of a signal s(x) can be represented as multiplication by a comb function as follows:

$$s_n(x) = s(x) \sum_{n=-\infty}^{\infty} \delta(x - n\Delta x - x_0), \tag{1}$$

where $s_n(x)$ is the sampled signal, $\delta(x)$ is the Dirac delta function, $x_0$ is the location of the origin of the sampling function, and $\Delta x$ is the sampling interval. Note that due to the periodic nature of the comb function in equation (1), we can restrict $x_0$, without loss of generality, as follows:

$$-\Delta x/2 \leq x_0 < \Delta x/2. \tag{2}$$

If we Fourier transform equation (1) we obtain the following wavenumber domain representation of sampling:

$$S_n(k) = S(k) * \left( \frac{1}{\Delta x} \sum_{n=-\infty}^{\infty} e^{i2\pi \frac{nx_0}{\Delta x}} \delta\left(k - \frac{n}{\Delta x}\right) \right), \tag{3}$$

where the symbol * is used to denote convolution in the wavenumber domain. The above equation shows that the sampled, amplitude spectrum is periodic with wavenumber period $1/\Delta x$. Equation (3) also indicates that the Fourier spectrum of the sampled signal is a linear superposition of an infinite number of shifted copies of the Fourier transform of the continuous signal. The process of wavenumber shifting and adding the continuous spectrum is called "folding," and the center of the first folding is $\frac{1}{2}\Delta x$ which is called the "folding wavenumber."

If there is a finite maximum wavenumber in the continuous signal, then the following equation is true:

$$S(k)=0 \text{ for } |k| \geq k_{max}. \tag{4}$$

This means that there will only be a finite number of copies of the continuous Fourier spectrum folded onto the spectrum of the sampled signal. If $k_{max}<(2M+1)/2\Delta x$, where M is an integer greater than or equal to zero, then equation (3) is modified as follows:

$$S_n(k) = \frac{1}{\Delta x} \sum_{n=-M}^{M} e^{i2\pi \frac{nx_0}{\Delta x}} S\left(k - \frac{n}{\Delta x}\right) \text{ for } |k| \leq \frac{1}{2\Delta x}, \tag{5}$$

The above summation limits result since the other contributions in the infinite sum are zero. When M=0 the sampled data satisfy the Nyquist condition, and we obtain the following:

$$S_n(k) = \frac{1}{\Delta x} S(k) \text{ for } |k| \leq \frac{1}{2\Delta x} \text{ and } k_{max} < \frac{1}{2\Delta x}. \tag{6}$$

Equation (6) only equates the low wavenumber parts of the sampled and continuous spectra. At higher wavenumbers the sampled spectrum obeys the following equation:

$$S_n(k) = e^{-2\pi \frac{nx_0}{\Delta x}} S_n(k - n/\Delta x), \tag{7}$$

which can be used to calculate the sampled spectrum for higher wavenumbers. Equation (7) is always true even if there is no limit on the continuous spectrum like equation (4).

A further simplification of equation (5) can be made for real signals s(x). If the signal is real, then its Fourier transform has the following property:

$$S_n(-k)=S_n^*(k) \tag{8}$$

(i.e., the negative wavenumber spectrum can be obtained by taking the complex conjugate of the corresponding positive wavenumber spectrum). If one considers only the positive wavenumber spectrum in equation (5) the following simplification can be made:

$$S_n(k) = \frac{1}{\Delta x} \sum_{n=-M_-}^{M_+} e^{i2\pi \frac{nx_0}{\Delta x}} S\left(k - \frac{n}{\Delta x}\right) \text{ for } 0 \leq k \leq \frac{1}{2\Delta x}, \tag{9a}$$

where the integers $M_+$ and $M_-$ are the smallest integers which satisfy $$k_{max} \leq \frac{2M_+ + 1}{2\Delta x} \tag{9b}$$

and $$k_{max} \leq \frac{M_- + 1}{\Delta x}. \tag{9c}$$

$M=M_+ \pm M_-$ denotes the amount of folding which occurs due to sampling. If M=0, then no folding has occurred. If M=1, then the spectrum has folded once. If M=2, then the spectrum has folded twice, etc.

Equation (9a) with the auxilliary equations (6) and (8) provide a general description of the effects of sampling on a real, continuous space signal. Equation (9a) is used to calculate the positive wavenumber components within the first period of the sampled signal's spectrum, and equation (8) is used to obtain the corresponding negative wavenumber components within the first period. Then equation (6) is used to calculate the higher wavenumber components using the periodic nature of the sampled spectrum. We will now apply these equations to describe aliasing in an ideal survey (i.e., ideal-pattern-acquisition survey) with a uniform pattern. The following three conventions simplify the mathematics without sacrificing generality and will be used in our discussion:

1. Choose the image bin interval just small enough to prevent aliasing of a fully sampled common-offset section (i.e., $k_{max}=\frac{1}{2}\Delta x_m$).
2. Choose the origin of the sampling function for zero offset to be zero (i.e., $x_0=0$ for zero offset in equation (1)), and increment $x_0$ by $\Delta x_m$ as the half offset is increased.

3. Set the receiver interval to twice the image bin interval (i.e., $\Delta x_r = 2\Delta x_m$).

Criterion 1 ensures that a fully sampled offset $S_h(X)$ will not alias when sampled to become $S_{hn}(x)$. Then equation (7) holds for $S_{hn}(x)$ and $S_h(X)$. $S_h(X)$ is an individual timeslice out of a common offset section, and we could label each timeslice by including the time dependence (i.e., $S_h(x,t)$). However, we will omit the time index in the following discussion, because it is not relevant to the discussion of spatial aliasing. Criteria 2 and 3 force the origin of the sampling function to be an integer multiple of the image bin interval as follows:

$$x_{0h} = n_h \Delta x_m, \quad (10)$$

where $$n_h = |x_h|/\Delta x_m \quad (11)$$

is an integer which increases by one with each half offset $x_h$ and is zero for zero offset.

The common-offset sampling interval is $$\Delta x = n_{pattern} \Delta x_m. \quad (12a)$$

Criterion 1 requires that $$k_{max} = \frac{1}{2}\Delta x_m. \quad (12b)$$

Note if finer sampling than required by equation (12b) is used, then the requirements derived in this Appendix will still prevent aliasing. However, an oversampled survey might have less demanding acquisition requirements when expressed in terms of pattern number.

Substitute equations (12a) and (12b) into inequalities (9b) and (9c) as follows:

$$M_+ \geq \frac{n_{pattern} - 1}{2}, \quad (13a)$$

and $$M_- \geq \frac{n_{pattern}}{2} - 1, \quad (13b)$$

where the smallest integers $M_+$ and $M_-$ which satisfy inequalities (13a) and (13b) are taken as the values in equation (9a). Adding inequalities (13a) and (13b) yields the following formula for the amount of folding:

$$M = M_+ + M_- = n_{pattern} - 1, \quad (13c)$$

rounded up to the nearest integer. Substitute equations (10) and (12) into equation (9a) as follows:

$$S_{hn}(k_m) = \frac{1}{n_{pattern}\Delta x_m} \sum_{n=-M_-}^{M_+} e^{i2\pi n_h \frac{n}{n_{pattern}}} S_h\left(k_m - \frac{n}{n_{pattern}\Delta x_m}\right) \quad (14)$$

for $0 \leq k_m \leq \frac{1}{2\Delta x_m}$.

Equation (14) is the relationship between the continuous, unaliased data $S_h$ and the discrete, aliased data $S_{hn}$. Note that the sampled offset data is a linear superposition of wavenumber shifted versions of the continuous offset data.

Equation (14) is the main point of this section. This equation is a vital piece of the wavefield reconstruction problem. In the next section we will derive the relationship between different offsets which will allow us to complete our description of the ideal-pattern-acquisition survey.

Dealiasing a Redundantly Sampled Offset

Later, equation (14) will be used to derive the single fold requirement for wavefield reconstruction. However, we can anticipate this answer by considering offsets which are very close to each other. We will find in the section on offset transformation that when offsets are close together the transformation operator reduces to a delta function. In other words, offsets which are close to each other are nearly identical after NMO.

The above considerations lead us to consider the problem of reconstructing a single offset which has been sampled as if ideal marine pattern shooting had occurred, but we will ignore the difference between offsets. Let N sampled offsets $S_{hn}$ be taken from the same common-offset section $S_h$, but sampled with different origins as described by equation (10). The origin $x_0$ is varied but the offset is not. If we label the various samplings of the unaliased offset $S_h$ by the value of $n_h$, then we obtain the following matrix equation for the various offsets:

$$\begin{pmatrix} S_{0n} \\ S_{1n} \\ S_{2n} \\ \vdots \\ S_{Nn} \end{pmatrix} = \frac{1}{n_{pattern}\Delta x_m} \begin{pmatrix} 1 & 1 & \ldots & 1 & 1 & 1 & \ldots & 1 & 1 \\ E^{-M_-} & E^{-(M_- - 1)} & \ldots & E^{-1} & 1 & E & \ldots & E^{M_+ - 1} & E^{M_+} \\ E^{-2M_-} & E^{-2(M_- - 1)} & \ldots & E^{-2} & 1 & E^2 & \ldots & E^{2(M_+ - 1)} & E^{2M_+} \\ \vdots & \vdots & \ddots & \vdots & 1 & \vdots & \ddots & \vdots & \vdots \\ E^{-NM_-} & E^{-N(M_- - 1)} & \ldots & E^{-N} & 1 & E^N & \ldots & E^{N(M_+ - 1)} & E^{NM_+} \end{pmatrix} \begin{pmatrix} S_h\left(k_m + \frac{M_-}{n_{pattern}\Delta x_m}\right) \\ S_h\left(k_m + \frac{M_- - 1}{n_{pattern}\Delta x_m}\right) \\ \vdots \\ S_h\left(k_m + \frac{1}{\Delta x_m}\right) \\ S_h(k_m) \\ S_h\left(k_m - \frac{1}{\Delta x_m}\right) \\ \vdots \\ S_h\left(k_m - \frac{M_+ - 1}{n_{pattern}\Delta x_m}\right) \\ S_h\left(k_m - \frac{M_+}{n_{pattern}\Delta x_m}\right) \end{pmatrix}, \quad (15)$$

where N+1 is the number of samplings of $S_h$ and $$E \equiv e^{i2\pi/n_{pattern}}. \tag{16}$$

It is immediately apparent from equation (15) (and using equation (13c)) that the solution requires that $$N \geq M_+ + M_- = n_{pattern} - 1. \tag{17}$$

If inequality (17) is violated, then the matrix equation (15) is underdetermined and a unique solution does not exist. If there are more offsets than the pattern number, then equation (15) is overdetermined and a least squares or psuedo inverse solution is recommended. The psuedo inverse solution is given by the following:

$$S = n_{pattern} \Delta x_m (E^T E)^{-1} E^T S_n, \tag{18}$$

where S is the least squares solution for the vector on the right-hand side of equation (15), E is the matrix on the right-hand side of equation (15), and $S_n$ is the vector on the left-hand side of equation (15). The superscript T represents the operation of transposing the matrix and taking the complex conjugate of the elements in the matrix.

The conjugate transpose of E is given by $$E^T = \begin{pmatrix} 1 & E^{M_-} & \ldots & E^{(N-1)M_-} & E^{NM_-} \\ 1 & E^{M_--1} & \ldots & E^{(N-1)(M_--1)} & E^{N(M_--1)} \\ \vdots & \vdots & \vdots & \ddots & \vdots \\ 1 & E & E^2 & \ldots & E^N \\ 1 & 1 & 1 & 1 & 1 \\ 1 & E^{-1} & E^{-2} & \ldots & E^{-N} \\ \vdots & \vdots & \vdots & \ddots & \vdots \\ 1 & E^{-(M_+-1)} & \ldots & E^{-(N-1)(M_+-1)} & E^{-N(M_+-1)} \\ 1 & E^{-M_+} & \ldots & E^{-(N-1)M_+} & E^{-NM_+} \end{pmatrix}, \tag{19}$$

and the product $E^T E$ is then $$E^T E = \begin{pmatrix} N+1 & \sum_{n=0}^{N} E^n & \sum_{n=0}^{N} E^{2n} & \ldots & \sum_{n=0}^{N} E^{(n_{pattern}-1)n} \\ \sum_{n=0}^{N} E^{-n} & N+1 & \sum_{n=0}^{N} E^n & \ldots & \sum_{n=0}^{N} E^{(n_{pattern}-2)n} \\ \sum_{n=0}^{N} E^{-2n} & \sum_{n=0}^{N} E^{-n} & N+1 & \ldots & \sum_{n=0}^{N} E^{(n_{pattern}-3)n} \\ \vdots & \vdots & \vdots & \ddots & \vdots \\ \sum_{n=0}^{N} E^{-(n_{pattern}-1)n} & \sum_{n=0}^{N} E^{-(n_{pattern}-2)n} & \sum_{n=0}^{N} E^{-(n_{pattern}-3)} & \ldots & N+1 \end{pmatrix}. \tag{20}$$

The summations in equation (20) can be evaluated using the well known geometric series formula, $$\sum_{n=0}^{N} z^n = \frac{1-z^{N+1}}{1-z}. \tag{21}$$

However, note that if we choose the number of offsets (N+1) such that $E^{N-1}+1$, then equation (20) is simplified since all of the off-diagonal terms are zero. This condition is satisfied whenever the number of offsets is an integer multiple of the pattern number as follows:

$$N+1 = mn_{pattern}, \tag{22}$$

where m is an integer greater than zero. Substitute equation (22) into equation (20) and use equation (21) to obtain $$E^T E = \begin{pmatrix} mn_{pattern} & 0 & 0 & 0 & 0 \\ 0 & mn_{pattern} & 0 & 0 & 0 \\ 0 & 0 & mn_{pattern} & 0 & 0 \\ \vdots & \vdots & \vdots & \ddots & \vdots \\ 0 & 0 & 0 & \ldots & mn_{pattern} \end{pmatrix} = mn_{pattern} I, \tag{23}$$

Where I is the identity matrix. Equation (23) can be easily inverted to yield $$(E^T E)^{-1} = \frac{1}{mn_{pattern}} I. \tag{24}$$

Now substitute equation (24) in equation (18) to obtain $$S = \frac{\Delta x_m}{m} E^T S_n. \tag{25}$$

At this point it is important to note that the elements in the vector S are redundant, since we can determine the wavenumber spectrum from $S_h(k_m)$ or any of its shifted versions $S_h(k_m - n/\Delta x_m)$. Extract the row of the matrix equation (25) corresponding to the unshifted wavenumber spectrum, and obtain the following formula for $S(k_m)$ (i.e., the row containing all ones in equation (19)):

$$S_h(k_m) = \frac{\Delta x_m}{m} \sum_{h=0}^{mn_{pattern}-1} S_{hn}(k_m). \tag{26}$$

The factor 1/m compensates for the extra fold in the overdetermined form of equation (15). If m=1, then the equation is exactly determined and equation (15) describes a unique solution to the problem of reconstructing an offset section from pattern sampling of the offset section. Note that this corresponds with the intuitive solution to the problem of just summing all of the partially sampled offsets to form the unaliased section.

The general case of N+1 not a multiple of the pattern number requires special handling. Since the phase term raised to a power $E^n$ is periodic, one will find identical rows in the matrix in equation (15) whenever the offset numbers $n_h$ for two rows differ by a multiple of the pattern number $n_{pattern}$. In other words, whenever $$0 = \mathrm{mod}_{n_{pattern}}(n_j - n_i). \quad (27)$$

where $\mathrm{mod}_n(m)$ is defined as the remainder of the quotient m/n. The identical rows need to be eliminated using standard linear algebra techniques. The easiest way to handle this situation is to realize that offsets which satisfy equation (27) are identical samplings of the offset. Therefore, a convenient way to handle the general overdetermined version of equation (15) is to sum the identical samplings and form a square matrix as follows:

$$\begin{pmatrix} \frac{1}{N_0} \sum_{j=0}^{N_0-1} S_{(0+jn_{pattern})n} \\ \frac{1}{N_1} \sum_{j=0}^{N_1-1} S_{(1+jn_{pattern})n} \\ \frac{1}{N_2} \sum_{j=0}^{N_2-1} S_{(2+jn_{pattern})n} \\ \vdots \\ \frac{1}{N_{n_{pattern}-1}} \sum_{j=0}^{N_{n_{pattern}-1}-1} S_{(n_{pattern}-1+jn_{pattern})n} \end{pmatrix} = \frac{1}{n_{pattern} \Delta x_m} ES, \quad (28)$$

where $N_i$ is the number of samplings which satisfy equation (27), S is the vector of unaliased data as defined above, and E is a square matrix as defined above. Since E satisfies our prior constraint $N+1 = n_{pattern}$ the product $E^T E$ is diagonal and we obtain the solution $$S = \Delta x_m E^T \begin{pmatrix} \frac{1}{N_0} \sum_{j=0}^{N_0-1} S_{(0+jn_{pattern})n} \\ \frac{1}{N_1} \sum_{j=0}^{N_1-1} S_{(1+jn_{pattern})n} \\ \frac{1}{N_2} \sum_{j=0}^{N_2-1} S_{(2+jn_{pattern})n} \\ \vdots \\ \frac{1}{N_{n_{pattern}-1}} \sum_{j=0}^{N_{n_{pattern}-1}-1} S_{(n_{pattern}-1+jn_{pattern})n} \end{pmatrix}, \quad (29)$$

which is a particular example of equation (25) with m=1 and the $S_n$ vector is replaced with the vector on the right-hand side of equation (29). Once again we only need to take the row corresponding to $S_h(k_m)$, since the other rows are redundant. Therefore, the solution to the general overdetermined problem is as follows:

$$S_h(k_m) = \Delta x_m \sum_{i=0}^{n_{pattern}-1} \frac{1}{N_i} \sum_{j=0}^{N_i-1} S_{(i+jn_{pattern})n}. \quad (30)$$

In other words, sum the samplings that contribute to the same midpoint locations and divide by the fold. Then sum these average samplings to form the reconstructed offset. This is exactly what one would expect intuitively. Stack all of the data and normalize by the fold.

Kinematics of Offset Transformation

The seismic wavefield can be written in midpoint offset coordinates as $W(t, x_m, x_h)$. In this section the wavefield which has been NMO corrected at the constant-medium velocity V will be used, where $$t_n \equiv \sqrt{t^2 - \left(\frac{2h_n}{V}\right)^2} \quad (31)$$

is the time at offset $h_n$ after NMO. We will also have a need to refer to midpoint coordinates associated with different offsets, so for offset n we will indicate the associated midpoint coordinate by $x_n$.

If we hold the half offset $x_h$ fixed at $h_2$ and take the Fourier transform over time and midpoint:

$$W(f,k,h_2) = \int\int dt_2 \, dx_2 \, W(t_2, x_2, h_2) e^{-i2\pi(ft_2 - kx_2)}, \quad (32)$$

where $x_2$ is the midpoint coordinate for offset $h_2$. In order to keep the equations in this section simpler, subscripts have been dropped from f and k. Keep in mind that these are the variables Fourier conjugate to $t_2$ and $x_2$, respectively.

The goal of this section is to rewrite equation (32) in terms of time and midpoint coordinates at another offset ($t_1$, $x_1$, $h_1$). In order to do this we need to establish the relationship between the reflection point on different offsets.

The relationship between the zero offset time and the arrival time at half offset $h_n$ after NMO from a reflection point with inline time dip D after NMO is as follows:

$$t_0 = \frac{t_n}{A_n}, \quad (33)$$

where n is the offset index and $$A_n = A_n(D, t_n, h_n) = \sqrt{1 + \left(\frac{Dh_n}{t_n}\right)^2}. \quad (34)$$

In equation (34) D is the time dip on a zero offset section given by $$D = 2 \sin \alpha / V, \quad (35)$$

where $\alpha$ is the dip angle in the plane of the section and V is the medium velocity.

A relationship between midpoint location of a reflector point between zero offset and offset $h_n$ is as follows:

$$x_0 = x_n - \frac{h_n^2 D}{A_n t_n}. \quad (36)$$

Remember that midpoint variables are indicated by $x_n$ and half offsets are indicated by $h_n$.

Equations (35) and (36) allow us to find the zero offset time and midpoint ($t_0, x_0$) of a reflection point on a non-zero offset section ($t_n, x_n$).

If we consider two offsets, $h_1$ and $h_2$, we can use equation (33) twice to obtain a relationship between post-NMO arrival times on the two offsets as follows:

$$\frac{t_1}{A_1} = \frac{t_2}{A_2}. \quad (37)$$

Two applications of equation (36) yield a relationship between midpoint locations of a reflection point on the above two offsets as follows:

$$x_1 - \frac{h_1^2 D}{A_1 t_1} = x_2 - \frac{h_2^2 D}{A_2 t_2}. \tag{38}$$

With the kinematic equations (37) and (38) we can obtain valuable information about the range of the offset transformation operator. First, from equation (38) we can derive the following formula for $X_2-X_1$:

$$x_2 - x_1 = \frac{h_2^2 D}{A_2 t_2} - \frac{h_1^2 D}{A_1 t_1} = \left(\frac{h_2^2}{A_2 t_2} - \frac{h_1^2}{A_1 t_1}\right) D. \tag{39}$$

The magnitude $|x_2-x_1|$ is limited by equation (39). For example, at zero dip D=0 and the change in midpoint location is also zero. Equation (39) is a monotonic function of D and takes on its maximum value as D becomes infinite which corresponds to vertical time dip which can only result from dipping layers with a very slow velocity (as can be seen in equation (35)) as follows:

$$\lim_{|D|\to\infty} |x_2 - x_1| = \left| \frac{h_2^2}{\frac{h_2}{t_2} t_2} - \frac{h_1^2}{\frac{h_1}{t_1} t_1} \right| = |h_2 - h_1|. \tag{40}$$

Equations (39) and (40) tell us that $$|x_2-x_1| \leq |h_2| - |h_1| \tag{41}$$

for any offset transformation for the full range of possible dips. So offset transformation is confined to a cone in offset-CMP coordinates defined by $|x_2-x_1|=|h_2-h_1|$. The edge of the cone is only approached for significant dip and slow velocity (see equation (35)), and zero dip is confined to $|x_2-x_1|=0$ which corresponds to no change in midpoint. The output of offset transformation is centered along the offset axis at the CMP location of the input data, and steep dip contributions will appear at other midpoint locations but within the cone defined by inequality (41).

For DMO $h_2=0$ and $h_1=h$ being some particular offset. So, from inequality (41) we find that $|x_0-x_n|<h$. The latter inequality tells us that the width of the DMO smile is equal to 2h which is the offset of the input common offset section.

Now we will derive the limit on the change in the time coordinate of the offset transformation operator. From equation (37) we obtain the following expression:

$$t_2 - t_1 = t_2\left(1 - \frac{A_1}{A_2}\right) = t_1\left(\frac{A_2}{A_1} - 1\right). \tag{42}$$

For zero dip $A_1=A_2=1$ (see equation (34)) and we get $t_2-t_1=0$. Flat reflectors map to the same time. Equation (42) is a monotonic function of D which was also the case with equation (39). Equation (42) is monotonically decreasing if $h_2<h_1$ ($t_2<t_1$), and it is montonically increasing if $h_2>h_1$ ($t_2>t_1$). If we take the limit as D becomes infinite in equation (42) we obtain:

$$t_{2,extreme} - t_1 = \lim_{|D|\to\infty} t_1\left(\frac{\left|\frac{h_2 D}{t_{2,extreme}}\right|}{\left|\frac{h_1 D}{t_1}\right|} - 1\right) = t_1\left(\frac{h_2 t_1}{h_1 t_{2,extreme}} - 1\right), \tag{43}$$

which yields the following quadratic equation for $t_{2,extreme}$:

$$t_{2,extreme}^2 - \frac{h_2 t_1^2}{h_1} = 0. \tag{44}$$

Equation (44) has only one positive solution as follows:

$$t_{2,extreme} = t_1 \sqrt{\frac{h_2}{h_1}}. \tag{45}$$

Equation (45) tells us that the reflector time on offset 2 for infinite dip is proportional to the input sample's time $t_1$ and the proportionality is the square root of the ratio of the output offset to the input offset. For DMO $h_2=0$, and equation (45) yields $t_{2,extreme}=0$. In other words the DMO operator sweeps all the way from $t_1$ up to zero for every input offset.

When $h_2>h_1$, equation (45) yields a maximum deviation from $t_1$ in the positive time direction. In other words, offset transformation to a larger offset maps samples to times greater than or equal to their input time. The limits for the two cases are summarized below.

$$t_1 \sqrt{\frac{h_2}{h_1}} \leq t_2 \leq t_1 \text{ for } h_2 < h_1, \tag{46}$$

and $$t_1 \leq t_2 \leq t_1 \sqrt{\frac{h_2}{h_1}} \text{ for } h_2 > h_1. \tag{47}$$

Equations (37) and (38) can be used to derive the time mapping for offset transformation. The two equations can be used to eliminate the reflector dip D and derive a relationship between the time and offset mapping. First solve equation (37) for the dip D as follows:

$$D = \pm \sqrt{\frac{t_1^2 - t_2^2}{\left(\frac{h_1 t_2}{t_1}\right)^2 - \left(\frac{h_2 t_1}{t_2}\right)^2}}. \tag{48}$$

Note that there are two solutions, and the dip is a function of the ratio $t_1/t_2$, and from inequalities (46) and (47) it can be shown that the quantity inside the square root in equation (48) is always positive. Substitution of equation (48) into equation (38) yields the following expression for the change in midpoint as a function of the ratio $t_1/t_2$:

$$x_2 - x_1 = \tag{49}$$

$$\pm \sqrt{\frac{t_1^2 - t_2^2}{\left(\frac{h_1 t_2}{t_1}\right)^2 - \left(\frac{h_2 t_1}{t_2}\right)^2}} \left( \frac{h_2^2}{\sqrt{1 + \left(\frac{h_2}{t_2}\right)^2 t_1^2 - \frac{t_2^2}{\left(\frac{h_1 t_2}{t_1}\right)^2 - \left(\frac{h_2 t_1}{t_2}\right)^2}}} - \right.$$

-continued $$\frac{h_1^2}{\sqrt{1+\left(\frac{h_1}{t_1}\right)^2 t_1^2 - \frac{t_2^2}{\left(\frac{h_1 t_2}{t_1}\right)^2 - \left(\frac{h_2 t_1}{t_2}\right)^2}}}\Bigg),$$

which can be simplified as follows:

$$x_2 - x_1 = \pm \sqrt{\frac{t_1^2 - t_2^2}{\left(\frac{h_1 t_2}{t_1}\right)^2 - \left(\frac{h_2 t_1}{t_2}\right)^2}} \left(\frac{h_2^2}{t_2 \sqrt{\frac{\left(\frac{h_1 t_2}{t_1}\right)^2 - h_2^2}{\left(\frac{h_1 t_2}{t_1}\right)^2 - \left(\frac{h_2 t_1}{t_2}\right)^2}}} - \frac{h_1^2}{t_1 \sqrt{\frac{h_1^2 - \left(\frac{h_2 t_1}{t_2}\right)^2}{\left(\frac{h_1 t_2}{t_1}\right)^2 - \left(\frac{h_2 t_1}{t_2}\right)^2}}}\right). \quad (49a)$$

Multiply through by the denominator of the first factor on the right-hand side, and introduce absolute values since the numerator and denominator change sign depending on the sign of the offset difference.

$$x_2 - x_1 = \qquad (49b)$$

$$\pm \sqrt{|t_1^2 - t_2^2|} \left(\frac{h_2}{t_2 \sqrt{\left|\left(\frac{h_1 t_2}{h_2 t_1}\right)^2 - 1\right|}} - \frac{h_1}{t_1 \sqrt{\left|1 - \left(\frac{h_2 t_1}{h_1 t_2}\right)^2\right|}}\right).$$

Multiply the numerator and denominator of the first term in parenthesis by $h_2 t_1/h_1 t_2$ and combine the two terms in parenthesis.

$$x_2 - x_1 = \pm \sqrt{|t_1^2 - t_2^2|} \left(\frac{\left(\frac{h_2}{t_2}\right)^2 \frac{t_1}{h_1} - \frac{h_1}{t_1}}{\sqrt{\left|1 - \left(\frac{h_2 t_1}{h_1 t_2}\right)^2\right|}}\right). \quad (49c)$$

Factor $h_1/t_1$ from the numerator in parenthesis.

$$x_2 - x_1 = \pm \sqrt{|t_1^2 - t_2^2|} \left(\frac{h_1}{t_1}\left(\frac{h_2 t_1}{h_1 t_2}\right)^2 - \frac{1}{\sqrt{\left|1 - \left(\frac{h_2 t_1}{h_1 t_2}\right)^2\right|}}\right). \quad (49d)$$

Divide the denominator into the numerator and make use of inequalities (46) and (47) to determine the sign.

$$x_2 - x_1 = \pm \mathrm{sign}(h_2 - h_1)\frac{h_1}{t_1}\sqrt{(t_1^2 - t_2^2)\left(1 - \left(\frac{h_2 t_1}{h_1 t_2}\right)^2\right)}. \quad (49e)$$

Thus we obtain the following formulas for $x_2-x_1$:

$$x_2 - x_1 = \mp h_1 \sqrt{\left(1 - \left(\frac{t_2}{t_1}\right)^2\right)\left(1 - \left(\frac{h_2 t_1}{h_1 t_2}\right)^2\right)} \quad \text{if } h_2 < h_1 \quad (50a)$$

and $$x_2 - x_1 = \pm h_2 \sqrt{\left(1 - \left(\frac{t_1}{t_2}\right)^2\right)\left(1 - \left(\frac{h_1 t_2}{h_2 t_1}\right)^2\right)} \quad \text{if } h_1 < h_2. \quad (50b)$$

The above formulas properly handle zero offset. If the equations are not factored as shown, then one would have to handle division by zero in the right-most term inside the square root.

In principle the mapping of offset transformation is given by equation (50a) or (50b). However, in practice it is often more convenient to calculate the relationships between the times ($t_1$ and $t_2$) given the midpoint locations.

Equations (50a) and (50b) can be put in the form of quadratic equations in $(t_2/t_1)^2$ and $(t_1/t_2)^2$, respectively, as follows:

$$\left(\frac{t_2}{t_1}\right)^4 + \left(\left(\frac{x_2 - x_1}{h_1}\right)^2 - 1 - \left(\frac{h_2}{h_1}\right)^2\right)\left(\frac{t_2}{t_1}\right)^2 + \left(\frac{h_2}{h_1}\right)^2 = 0 \text{ if } h_2 < h_1, \quad (51a)$$

and $$\left(\frac{t_1}{t_2}\right)^4 + \left(\left(\frac{x_2 - x_1}{h_2}\right)^2 - 1 - \left(\frac{h_1}{h_2}\right)^2\right)\left(\frac{t_1}{t_2}\right)^2 + \left(\frac{h_1}{h_2}\right)^2 = 0 \text{ if } h_2 > h_1. \quad (51b)$$

There is only one positive real solution to both equations as follows:

$$\frac{t_2}{t_1} = \frac{1}{h_1}\sqrt{\frac{U+V}{2}} \quad \text{if } h_2 < h_1, \quad (52a)$$

and $$\frac{t_1}{t_2} = \frac{1}{h_2}\sqrt{\frac{U+V}{2}} \quad \text{if } h_2 > h_1, \quad (52b)$$

where $$U \equiv h_1^2 + h_2^2 - (x_2 - x_1)^2, \quad (52c)$$

and $$V \equiv \sqrt{U^2 - 4h_1^2 h_2^2}. \quad (52d)$$

Equation (52a–b) will turn out to give the mapping of offset transformation. The proof of this and the derivation of the amplitude weighting of offset transformation to produce true amplitudes is in the following section.

Note that from equations (52a–b) that the ratio of the reflection time on two different offsets is independent of time. This ratio is only a function of the offsets and the change in midpoint location. This self-similar or fractal nature of the time mapping is also true for DMO which corresponds to equation (52a) with $h_2=0$ as follows:

$$\left(\frac{t_2}{t_1}\right)_{DMO} = \sqrt{1 - \left(\frac{x_2 - x_1}{h_1}\right)^2}, \quad (52e)$$

which is the familiar DMO ellipse.

F-K Offset Transformation

We will now proceed to derive the f-k form of the offset transformation operator. If we change variables inside the integrals in equation (32) from offset $h_2$ to offset $h_1$ we obtain using equations (37) and (38)

$$W(f, k, h_2) = \int\int dt_1 dx_1 J_{21} \exp\left(-i2\pi\left\{f\frac{A_2}{A_1}t_1 - k\left[x_1 - D\left(\frac{h_1^2}{A_1 t_1} - \frac{h_2^2}{A_2 t_2}\right)\right]\right\}\right) W(t_1, x_1, h_1), \quad (53)$$

where $$J_{21} = J_{21}(D, t_2, h_2, t_1, h_1) = \begin{vmatrix} \frac{\partial t_2}{\partial t_1} & \frac{\partial t_2}{\partial x_1} \\ \frac{\partial x_2}{\partial t_1} & \frac{\partial x_2}{\partial x_1} \end{vmatrix} = \begin{vmatrix} \frac{\partial t_2}{\partial t_1} & 0 \\ \frac{\partial x_2}{\partial t_1} & 1 \end{vmatrix} = \frac{\partial t_2}{\partial t_1}. \quad (54)$$

Recall that we are using the convention that f and k without subscripts correspond to offset 2. The right-hand column in equation (54) was obtained by differentiating equations (37) and (38). In order to evaluate the partial of $t_2$ with respect to $t_1$ we will use the chain rule and equation (37) as follows:

$$J_{21} = \frac{\partial t_2}{\partial t_1} = \frac{\partial t_0}{\partial t_1}\frac{\partial t_2}{\partial t_0} = \frac{2A_1^2 - 1}{A_1^3}\frac{A_2^3}{2A_2^2 - 1}. \quad (55)$$

In order to keep the notation more compact the explicit functional dependence of the A factors will not be written, but keep in mind that the A factors are functions of D and their respective h and t values.

It should be noted that there is an implicit high frequency approximation in equation (53) and all that follows. In particular we are assuming that the wavelet associated with a reflection is very narrow. Otherwise, it is not possible to just select a sample off of one offset and say it is due the same reflector point on another offset. Due to the finite length of wavelets and stretch effects, samples contain offset-varying, overlapping reflection contributions. However, it can be shown that for a delta-function wavelet we can neglect these effects.

Inverse Fourier transforming equation (53) we obtain the wavefield at offset $h_2$ in terms of the wavefield at offset $h_1$ as follows:

$$W(t_2, x_2, h_2) = \quad (56)$$
$$\int\int df dk \int\int dt_1 dx_1 J_{21} \exp\left(-i2\pi\left\{f\left(\frac{A_2}{A_1}t_1 - t_2\right) - k\left[x_1 - D\left(\frac{h_1^2}{A_1 t_1} - \frac{h_2^2}{A_2 t_2}\right) - x_2\right]\right\}\right) W(t_1, x_1, h_1).$$

Define $$\Phi = -2\pi\left\{f\left(\frac{A_2}{A_1}t_1 - t_2\right) - k\left[x_1 - D\left(\frac{h_1^2}{A_1 t_1} - \frac{h_2^2}{A_2 t_2}\right) - x_2\right]\right\}. \quad (57)$$

Using the definition of the A factors from equation (34) we can alter equation (57) as follows:

$$\Phi = \quad (58)$$
$$-2\pi\left\{f\left(\frac{A_2}{A_1}t_1 - t_2\right) - k\left[x_1 - \frac{1}{D}\left(\frac{t_1}{A_1}(A_1^2 - 1) - \frac{t_2}{A_2}(A_2^2 - 1)\right) - x_2\right]\right\}$$

Then equation (56) can be abbreviated as follows:

$$W(t_2, x_2, h_2) = \int\int dt_1 dx_1 \int\int df dk J_{21} e^{i\Phi} W(t_1, x_1, h_1). \quad (59)$$

In order to properly apply equation (59) we need to express D as a function of f and k in equation (53). The apparent time dip after NMO can be written in terms of the A factor as follows:

$$\frac{k_n}{f_n} = A_n D. \quad (60)$$

For the particular case of offset $h_2$ equation (60) can be solved for D as follows:

$$D = \frac{1}{A_2}\frac{k}{f}. \quad (61)$$

Substitute equation (61) in equation (58) to obtain $$\Phi = -2\pi\left\{f\left(\frac{A_2}{A_1}t_1 - t_2\right) - \right. \quad (62)$$
$$\left. k\left[x_1 - A_2\frac{f}{k}\left(\frac{t_1}{A_1}(A_1^2 - 1) - \frac{t_2}{A_2}(A_2^2 - 1)\right) - x_2\right]\right\},$$

which simplifies to the following:

$$\Phi = 2\pi\{fA_2(A_2 t_2 - A_1 t_1) - k(x_2 - x_1)\}. \quad (63a)$$

or, using equation (37)

$$\Phi = 2\pi\left\{f\left[t_2 - \left(\frac{A_2}{A_1} + A_2\left[A_1 - \frac{A_2^2}{A_1}\right]\right)t_1\right] - k(x_2 - x_1)\right\}. \quad (63b)$$

Note that the first factor of $A_2$ in the frequency term prevents the offset transformation operator from being unitary. In particular for DMO to be unitary the phase for the inverse operator should be the negative of the phase of the forward operator. But for DMO $A_2=1$ and $A_1=A$, so $$\Phi_{DMO} = 2\pi\{f(t_0 - At) - k(x_0 - x)\}, \quad (64a)$$

but for inverse DMO $A_2=A$ and $A_1=1$, therefore $$\Phi_{DMO^{-1}} = 2\pi\{fA(At - t_0) - k(x - x_0)\} \neq -\Phi_{DMO}. \quad (64b)$$

Substitute equation (61) into equation (34) to obtain the following expression for the A factors:

$$A_n = A_n(k/f, h_n, t_n) = \sqrt{1 + \left(\frac{h_n}{A_2 t_n}\frac{k}{f}\right)^2}. \quad (65)$$

Solve equation (65) for $A_2$ to obtain $$A_2 = \sqrt{\frac{1 + \sqrt{1 + 4\left(\frac{h_2 k}{t_2 f}\right)^2}}{2}}. \quad (66a)$$

Equation (65) can now be used to calculate $A_1$ as follows:

$$A_1 = \sqrt{1 + \left(\frac{h_1 k}{A_2 t_1 f}\right)^2}, \quad (66b)$$

where (66a) is first used to calculate $A_2$.

Equations (66a) and (66b) can now be used with equations (55), (59), and (63) in a Fourier implementation of offset transformation similar to f-k DMO. Note that the above system of equations with $h_1=0$ and $h_2=h$ gives the correct expression for "inverse DMO." In the geophysical literature, many authors try to derive "inverse DMO" by analogy with DMO and some incorrect assumptions (e.g., that DMO is a unitary operator). We can see from equation (55) that offset transformation is not unitary since the amplitude terms involving $A_1$ and $A_2$ invert when the direction of offset transformation is reversed (unitary operators have the same amplitude in the forward and inverse operator), and from equation (63) we can see that the phase does not simply change sign as required for a unitary operator when the direction of offset transformation is reversed.

If the fast Fourier transform algorithm (FFT) is to be exploited, then equations (66a) and (66b) may need to be modified. The time mapping of the offset transformation prevents it from being time invariant. Therefore, an FFT cannot be used on the input time coordinate. However, in equation (59) the integral over $x_1$ can be implemented using an FFT. This leaves the $t_1$, f, and k integrals to be evaluated as discrete sums which is significantly slower than an FFT. A different approach is to calculate the f-k wavefield using equation (53). Then inverse transform in equation (56) can be performed with an FFT. This approach requires modifying (66a) and (66b) to express the A factors in terms of $t_1$ only. If we substitute the kinematic identity (37) into equation (66a) we obtain the following:

$$A_2 = \sqrt{\frac{1 + \sqrt{1 + 4\left(\frac{A_1 h_2 k}{A_2 t_1 f}\right)^2}}{2}}. \quad (66c)$$

Now equations (66c) and (66b) must be solved simultaneously for the values of $A_1$ and $A_2$. An iterative approach starting with initial values of 1 will converge to the correct solution. The A factors are a function of k/f and can be stored in a table to be used in evaluating the f-k wavefield using equation (53). The values of D and $t_2$ in equation (53) can then be calculated using equations (61) and (37) respectively.

Due to the sparseness of all seismic data other than full stack array data, a stationary phase approximation to equation (59) is usually the most efficient way to implement offset transformation. However, the derivation of this approximation is not required for the further development of wavefield reconstruction. The derivation of the stationary phase approximation will be delayed to the end of this Appendix.

Wavefield Reconstruction

Now we are prepared to apply the theory of aliasing from signal processing to the problem of reconstructing missing data due to pattern shooting. First we will define a shorthand notation for the offset transformation operator in equation (59) as follows:

$$W(t_2,x_2,h_2) = \hat{O}_{21} W(t_1,x_1,h_1) = \int\int dt_1 dx_1 \int\int df\, dk\, J_{21} e^{i\Phi} W(t_1,x_1,h_1), \quad (67)$$

where $\hat{O}_{ji}$ is the operator which transforms the wavefield at offset i into the wavefield at offset j. The Jacobian $J_{21}$ is given by equation (55) and the phase $\Phi$ is given by equation (63). This operator is linear and space invariant but not time invariant. The only space dependence is in $\Phi$, and this dependence is only on the difference in midpoints $x_2-x_1$.

The derivation of equation (59) implicitly assumed that the wavelet is very high frequency and stretch effects due to NMO can be ignored. Therefore, application of equation (59) or (67) will result in slight errors due to stretch. However, operating on stretched data using the Jacobian transform of equation (59) results in a peak amplitude preserving algorithm. The wavelet will be distorted due to the difference in stretch between the input and output offset. For very broad band data this is not significant. It can be shown that for a delta-function wavelet there is no distortion due to stretch. We will not discuss the effects of stretch further except to note that this is an implicit approximation throughout this Appendix.

The Jacobian transformation used to derive equation (67) leads to the following property expressed in operator notation (as can be shown by two applications of equation (67)):

$$\hat{O}_{ki} = \hat{O}_{kj}\hat{O}_{ji}. \quad (68)$$

So the transformation of the wavefield from offset i to offset j followed by the transformation from offset j to offset k is equivalent to the single transformation directly from offset i to offset k. The inverse operator for offset transformation is the transposed offset transformation as follows:

$$\hat{O}_{ji}^{-1} = \hat{O}_{ij}, \quad (69)$$

which follows from equation (68) by setting the left hand side equal to the identity operator as follows:

$$\hat{1} = \hat{O}_{ii} = \hat{O}_{ij}\hat{O}_{ji} = \hat{O}_{ji}^{-1}\hat{O}_{ji}. \quad (70)$$

The offset transformation between identical offsets is the identity operator as can be verified by setting $h_1=h_2$ in equation (67). Since $\partial t_2/\partial t_1 = J_{21} = 1$ in this case, the A factor must be equal according to equation (55). This can only be true if $A_2=A_1$. Since the A factors are equal to 1, the phase in equation (63b) reduces to $\Phi = 2\pi\{f(t_2-t_1) - k(x_2-x_1)\}$. This phase combined with the Jacobian equal to 1 reduces equation (59) to a forward and inverse Fourier transform, which is an identity operation for any realizable wavefield.

In order to combine the signal processing theory of aliasing with offset transformation we need to express the effect of aliasing in the x-t domain. Transform equation (14) into the midpoint domain as follows:

$$s_{hn}(x_m) = \frac{1}{n_{pattern}\Delta x_m} \sum_{n=-M_-}^{M_+} e^{i2\pi n h \frac{n}{n_{pattern}}} e^{i2\pi \frac{n}{n_{pattern}\Delta x_m} x_m} s_h(x_m), \quad (71)$$

where $s_{hn}$ is the sampled offset data and $s_h$ is the ideal or continuous offset data. The second complex exponential factor in equation (71) is the representation of a wavenumber shift operator in the x domain.

The continuous offset data can be calculated from any other offset using the offset transformation operator of equation (67), and we substitute the transformed offset into equation (71) as follows:

$$W_s(t_j, x_j, h_j) = \qquad (72)$$

$$\frac{1}{n_{pattern}\Delta x_m} \sum_{n=-M_-}^{M_+} e^{i2\pi n j \frac{n}{n_{pattern}}} e^{i2\pi \frac{n}{n_{pattern}\Delta x_m} x_j} \hat{O}_{jr} W(t_r, x_r, h_r),$$

where $W_s(t_j,x_j,h_j)$ is the sampled wavefield at half offset $h_j$, $\Delta x_m$ is the midpoint interval, $n_j$ is the offset number defined by $|h_j/\Delta x_m|$, and $h_r$ a single continuous offset which has been selected for reconstruction.

Equation (72) resembles equation (14), the aliasing of a single offset. The main difference lies in the left-hand side of equation (72) where a different offset is sampled. To increase the resemblance to a single offset problem, operate on both sides of equation (72) with the offset transformation operator $\hat{O}_{rj}$ from offset j to offset r as follows:

$$\hat{O}_{rj} W_s(t_j, x_j, h_j) = \qquad (73)$$

$$\frac{1}{n_{pattern}\Delta x_m} \sum_{n=-M_-}^{M_+} e^{i2\pi n j \frac{n}{n_{pattern}}} \hat{O}_{rj} e^{i2\pi \frac{n}{n_{pattern}\Delta x_m} x_j} \hat{O}_{jr} W(t_r, x_r, h_r).$$

If the offset transformation operator commuted with the wavenumber shift operator, then we could remove the offset transformation operators on the right-hand side of equation (73) using identity (70). However, these operators do not commute at steep dips, and equation (73) must be left as written. An approximate solution can be derived from equation (73). Sum both sides of equation (73) over the N+1 sampled offsets as follows:

$$\sum_{j=0}^{N} \hat{O}_{rj} W_s(t_j, x_j, h_j) = \qquad (74)$$

$$\frac{1}{n_{pattern}\Delta x_m} \sum_{n=-M_-}^{M_+} \sum_{j=0}^{N} e^{i2\pi n j \frac{n}{n_{pattern}}} \hat{O}_{rj} e^{i2\pi \frac{n}{n_{pattern}\Delta x_m} x_j} \hat{O}_{jr} W(t_r, x_r, h_r).$$

It is desirable to use an integer multiple of the pattern number for the number of offsets used in the reconstruction, as will be seen below. Now partition the sum over j into partial sums of $n_{pattern}$ offsets as follows:

$$\sum_{j=0}^{N} \hat{O}_{rj} W_s(t_j, x_j, h_j) = \frac{1}{n_{pattern}\Delta x_m} \sum_{n=-M_-}^{M_+} \sum_{J=0}^{m-1} \hat{S}_{Jr} W(t_r, x_r, h_r), \quad (75a)$$

where $m=(N+1)/n_{pattern}$ is the number of offsets divided by the pattern number and $$\hat{S}_{Jr} \equiv \sum_{j=Jn_{pattern}}^{(J+1)n_{pattern}-1} e^{i2\pi \frac{n_j n}{n_{pattern}}} \hat{O}_{rj} e^{i2\pi \frac{n}{n_{pattern}\Delta x_m} x_j} \hat{O}_{jr}. \quad (75b)$$

For ideal-pattern data $n_j=j+$constant. If we choose the origin of the sampling function as zero at zero offset, then the constant is zero If the operators in definition (75b) did not depend on the index j, then the sum would reduce to the following:

$$\hat{S}'_{Jr} = \left( \sum_{j=Jn_{pattern}}^{(J+1)n_{pattern}-1} e^{i2\pi \frac{jn}{n_{pattern}}} \right) \hat{O}'_{Jr} = n_{pattern} \delta_{n0} \hat{O}'_{Jr}, \quad (76a)$$

where $\hat{O}'_{Jr}$ is the operator which does not depend on j and $\delta_{n0}$ is the Kronecker delta symbol defined by the following:

$$\delta_{n0} \equiv \begin{cases} 1 & \text{for } n = 0 \\ 0 & \text{otherwise} \end{cases}. \quad (76b)$$

Equation (76a) is not strictly applicable to equation (75b). However, if the offsets within a pattern number group (i.e., $\pm n_{pattern}/2$) are close enough, then we may replace the operators in equation (76a) with a representative operator from the range of offsets to obtain an approximation. Let us choose the operator corresponding to the first term in equation (75b) as the representative operator and approximate this equation as follows:

$$\hat{S}_{Jr} \approx \qquad (77)$$

$$\hat{O}_{r(Jn_{pattern})} e^{i2\pi \frac{n}{n_{pattern}\Delta x_m} x_J} \hat{O}_{(Jn_{pattern})r} \left( \sum_{j=Jn_{pattern}}^{(J+1)n_{pattern}-1} e^{i2\pi \frac{jn}{n_{pattern}}} \right).$$

Equation (77) is now in the form of equation (76a) where the product of the three operators on the right-hand side is the operator in equation (76a). The approximation in equation (77) corresponds to saying that the result of the three operations (offset transformation, wavenumber shifting, and inverse offset transformation) does not vary within a pattern number group. Apply equation (76a) to approximation (77) as follows:

$$\hat{S}_{Jr} \approx n_{pattern} \delta_{n0} \hat{O}_{r(Jn_{pattern})} e^{i2\pi \frac{n}{n_{pattern}\Delta x_m} x_J} \hat{O}_{(Jn_{pattern})r}. \qquad (78)$$

Substitute approximation (78) into equation (75a) as follows:

$$\sum_{j=0}^{N} \hat{O}_{rj} W_s(t_j, x_j, h_j) \approx \qquad (79)$$

$$\frac{1}{\Delta x_m} \sum_{n=-M_-}^{M_+} \sum_{J=0}^{m-1} \delta_{n0} \hat{O}_{r(Jn_{pattern})} e^{i2\pi \frac{n}{n_{pattern}\Delta x_m} x_J} \hat{O}_{(Jn_{pattern})r} W(t_r, x_r, h_r).$$

The sum over n in equation (79) yields only the n=0 term due to equation (76b). For n=0 the wavenumber shift operator reduces to the identity operator. With the wavenumber shift operator removed, the offset transformation operators combine to form an identity operator using property (70). After all of the above simplifications approximation (79) reduces to the following:

$$\sum_{j=0}^{N} \hat{O}_{rj} W_s(t_j, x_j, h_j) \approx \frac{1}{\Delta x_m} m W(t_r, x_r, h_r), \qquad (80)$$

which can be solved for the reconstructed wavefield as follows:

$$W(t_r, x_r, h_r) \approx \frac{\Delta x_m}{m} \sum_{j=0}^{mn_{pattern}-1} \hat{O}_{rj} W_s(t_j, x_j, h_j). \qquad (81)$$

Note that the index 0 does not necessarily correspond to zero offset. The only restriction is that a contiguous set of $mn_{pattern}$ offsets is used in approximation (81). It is not even necessary that the offset to be reconstructed fall in the range of offsets used for reconstruction in approximation (81).

Note that if the number of offsets is not a multiple of the pattern number, then there will be one partition of offsets (defined as the "remainder partition") which does not have a pattern number of traces. Equation (75b) would need the limits modified on the remainder partition, and when approximation (77) is made the sum will not reduce to a Kronecker delta symbol. This means the operators would not be completely eliminated on the right hand side of approximation (80), and formal solution of the problem would involve operators other than offset transformation (i.e., the inverse operators corresponding to equation (75b) modified for the remainder partition). The resulting equations would not yield the simple, closed form solution of approximation (81). Therefore, it is much simpler to use an integer multiple of the pattern number of input offsets when performing wavefield reconstruction.

DMO is Wavefield Reconstruction for Primary Imaging with Pattern Aliasing

A particular example of wavefield reconstruction is DMO which reconstructs the wavefield at zero offset. In this case approximation (81) becomes:

$$W(t_0, x_0, 0) \approx \frac{\Delta x_m}{m} \sum_{j=0}^{mn_{pattern}-1} \hat{O}_{0j} W_s(t_j, x_j, h_j). \qquad (82)$$

Except for the constant factor and the restriction to a multiple of the pattern number, approximation (82) describes controlled amplitude DMO and stack. The constant factor $\Delta x_m/m$ is required to make the output truly controlled amplitude. However, care must be taken in implementing approximation (81) or (82). The operators $\hat{O}_{rj}$ are defined as continuous operators and produce continuous spatial output, even though the input data $W_{sn}$ are sampled at discrete midpoints. Therefore, care must be taken to capture enough of the output to prevent aliasing. Generally if the output traces are separated by the stacking bin interval $\Delta x_m$ and the stacking bin interval is chosen to prevent aliasing, output aliasing will be avoided.

Note that the restriction of an integer multiple of the pattern number becomes less important when the number of offsets is large. In other words, if N+1 is large compared to the pattern number, then the deviation from a pattern number is a small fraction of the total contribution and we may approximate (82) as follows:

$$W(t_0, x_0, 0) \approx \frac{n_{pattern} \Delta x_m}{N+1} \sum_{j=0}^{N} \hat{O}_{0j} W_s(t_j, x_j, h_j). \qquad (83)$$

Approximation (83) is then identical to DMO multiplied by a normalization constant. It is important to realize that equation (83) is approximate. Especially for lower fold, artifacts will be produced, if the fold is not a multiple of the pattern number in equation (83).

Use of approximation (83) allows standard processes to be used to perform wavefield reconstruction. Note that approximation (83) is not restricted to a particular range of offsets. The only restriction is that a contiguous set of offsets is used. However, the warnings in the previous section concerning use of approximation (81) apply to approximation (82) or approximation (83).

Also if approximation (83) is to be used, care should be taken to take into account the time varying fold due to mute (i.e., the number of offsets available for reconstruction is time varying). Most stacking algorithms will do this automatically. Which means that the output of DMO and stack only needs to be multiplied by $n_{pattern}\Delta x_m$ to complete true amplitude wavefield reconstruction. In practice, it may be more desirable to reconstruct a sampled reconstructed offset. In the latter case the output of DMO should be multiplied by $n_{pattern}$, since the effect of sampling a continuous wavefield to a discrete unaliased wavefield cancels the factor of $\Delta x_m$ (see equation (7)).

Some seismic processing practices can prevent DMO from performing wavefield reconstruction. The three most common errors are as follows:

1. Discarding "replacement traces"—Replacement traces are defined as traces in a common offset which were dead before DMO. Note that approximations (82) and (83) imply that all of the output of DMO should be retained. In general, all wave-equation processes should retain all of the output. After a wave-equation process the correct location of the energy from an individual trace could be anywhere along the operator, and the fact that an output location was dead before the operator was applied is irrelevant.

2. Binning traces for FK DMO—FK DMO generally treats each common offset bin as a single offset. This compromises wavefield reconstruction since approximations (82) and (83) require that the DMO operator which corresponds to the true offset of each trace is applied. Grouping traces into common offset bins essentially redefines the offset sampling interval to be much larger and leads to more severe aliasing problems. Note that with Kirchhoff DMO when different offsets are binned together the offset of each trace can be honored. The outputs are all summed together, but this can be viewed as a partial summation which when combined with stack leads to approximation (83) except for a constant factor.

3. Amplitude errors—In general automatic gain control (AGC) disrupts the proper performance of any wave-equation process. AGC should be avoided whenever possible. The other common amplitude error is to use non-standard stacking algorithms (i.e., anything other than a standard mean calculation). A popular variation on stack is to raise the fold to a power before dividing in calculating the mean (e.g., powers in the range 0.5 to 1 are usually used). Stacks designed to suppress noise also can disrupt the proper functioning of wavefield reconstruction. The latter include median stacks and noise-suppression stacks (i.e., where a gain or envelope division is applied to traces before stack and an attempt is made to back out the effect of the gain after stack). Any deviation from a standard mean calculation leads to errors in wavefield reconstruction.

We now have the correct explanation for the observation that less acquisition effort than standard theory predicts produces acceptable results. DMO performs wavefield reconstruction. Historically, DMO was introduced into seismic data processing to allow simultaneous stacking of reflections with different dips. However, it was not previously understood that DMO also reduced the sampling requirements by approximately reconstructing the primary wavefield.

The only approximation is that the DMO operator is approximately constant within a pattern number partition. General Sampling Requirements for Wavefield Reconstruction For normal marine acquisition, wavefield reconstruction requires single fold and the recording of unaliased shot-records.

Adequate spatial sampling can be accomplished by choosing the output trace interval equal to the midpoint interval $\Delta x_m$ which satisfies standard imaging conditions. For example, if the maximum expected time dip on a common offset is $D_{max}=2 \sin \alpha_{max}/V$ and the maximum frequency to image is $f_{max}$, then the maximum wavenumber is given by the following:

$$k_{max}=2f_{max} \sin \alpha_{max}/V. \tag{84}$$

The Nyquist sampling theorem requires 2 samples per spatial period which gives the maximum midpoint interval as follows:

$$\Delta x_m \leq \frac{1}{2k_{max}} = \frac{V}{4f_{max}\sin\alpha_{max}}. \tag{85}$$

Our derivation of equations (82) and (83) implicitly assumed that the midpoint interval satisfied inequality (85). Otherwise, even a fully sampled common offset would have wavenumber folding. We assumed that a fully sampled offset does not alias.

The second requirement is that the data exhibit an ideal pattern which leads to the regular partioning of offsets used in equation (75b). This regular pattern is generated if the receiver interval is twice the midpoint interval and the shot interval is an integer multiple of the midpoint interval (i.e., the pattern number is an integer).

The above receiver interval is what is required to record unaliased shot records. Note hat most discussions of sampling assume that several domains must be unaliased. What the theory of wavefield reconstruction shows is that the application of wavefield reconstruction only requires one domain to be unaliased. This domain may be the shot domain as already demonstrated. If the receiver domain is unaliased then equations similar to equation (71) would result due to reciprocity. If a common offset is not aliased, then offset transformation can be applied directly to this offset to reconstruct other offsets.

Finally, the minimum acquisition which is not underdetermined corresponds to m=1 (i.e., the number of offsets is equal to the pattern number). This constrains the number of offsets N+1 to satisfy $$N+1 \geq n_{pattern}, \tag{86}$$

which using $N=(h_{max}-h_{min})/\Delta x_m$ and the definition of the pattern number relates the spread length to the shot interval as follows:

$$\frac{h_{max} - h_{min}}{\Delta x_m} + 1 \geq \frac{\Delta x_s}{\Delta x_m}. \tag{87}$$

Inequality (87) can be used to determine the minimum spread length for a given shot interval or to determine the maximum shot interval for a given spread length. Inequality (87) is equivalent to requiring single fold coverage in the stacking chart (i.e., every stacking bin is hit by at least one offset).

Note that due to mute, wavefield reconstruction will always break down at shallow times where the fold drops below the pattern number. Omitting mute from the processing sequence is not recommended. Mute is always required because far offsets yield no high-frequency information about shallow targets. The above observation is not dependent on the presence of NMO in a processing flow but is an inherent property of far traces. NMO is not the culprit. The problem is due to the recording geometry. In other words, using a migration or imaging algorithm which does not require NMO of the data before input does not change the fact that far traces view the shallow section at high angles and have a very limited vertical resolution. The true nature of the problem with far offsets is best observed on a raw gather. Far offsets have all of their information squeezed into a shorter time interval than near offsets (i.e., the amount of data after the first break is less on far traces than on near traces).

The requirements in this section are based on there being only a primary wavefield in the data. What we have shown is that if only primaries are present, single fold data is sufficient to reconstruct a good image. We have also demonstrated that reconstruction can be accomplished by proper application of DMO to the data.

Offset Transformation and Stack for Pre-Stack Applications

For imaging purposes, DMO followed by stack and post-stack migration is an adequate processing flow. For complex velocity fields where DMO and stack is not adequate, pre-stack migration can take on the reconstruction function. If pre-stack migration is used instead of DMO, then wavefield reconstruction can still be realized. This is based on the kinematic equivalence of NMO+DMO+Zero-Offset-Migration to Prestack-Migration. In other words DMO is implicitly part of prestack migration.

Care should be taken to avoid errors similar to those mentioned in the previous section as follows:

1. Keep all of the output. This is even more true for migration that for DMO. The correct location energy on output could be anywhere along the migration operator. The presence or absence of a trace before migration is irrelevant.
2. The offsets of each individual trace should be honored. This is easy with Kirchhoff algorithms. For FK algorithms different offsets need to be separated to prevent migration with the wrong offset.
3. Use straight stack to combine the output of migration. The time varying fold due to mute is handled by most stacking algorithms.

For imaging purposes the above considerations will yield proper wavefield reconstruction. However, it is often desireable to remove the aliasing from pre-stack data before migration (e.g., for multiple attenuation or velocity analysis). Recall that our derivation of DMO as wavefield reconstruction includes the stack process. The gathers output from DMO are not properly reconstructed pre-stack data.

Pre-stack wavefield reconstruction is accomplished using equation (81). Note that use of pre-stack wavefield reconstruction mixes contributions from a range of offsets. This range should be limited to nearby offsets if the output is intended for AVO purposes. Fortunately theoretical analysis of AVO effects shows that the amplitude variation on a gather due to targets of interests should have a very low spatial frequency (i.e., AVO can be approximated by a linear function of $\sin^2 \theta$, where $\theta$ is the reflection angle).

Stationary Phase Approximation to Offset Transformation

The approximation developed in this section is needed for efficient implementation of offset transformation in a computer program. This approximation was not required to derive wavefield reconstruction, but efficient application of wavefield reconstruction requires the stationary phase approximation.

To derive a Kirchhoff implementation of equation (59), we will apply the method of stationary phase to the f-k integrals in equation (59). In particular we will first approximate the k integral, since the dependence on k does not involve singularities and the transformation is offset invariant. The choice of the k integral for approximation is not arbitrary. The frequency integral involves singularities due to the presence of $1/f$ in the A factors. The $t_1$ integral involves singularities due to the presence of $1/t_1$ in $A_1$. The integral over $x_1$ is just a Fourier transform and needs no approximation.

The stationary phase approximation requires the phase in equation (63) to vary rapidly as k varies as follows:

$$\left|\frac{\Phi}{2\pi}\right| = |fA_2(A_1 t_1 - A_2 t_2) - k(x_1 - x_2)| \gg 1. \tag{88}$$

We want an approximation which is valid for all parts of the mapping given in equation (52a–d). In particular, we want the approximation to be valid when the x-t coordinates of the reflection point on both offsets are approximately equal (i.e., $t_1 \approx t_2$ and $x_1 \approx x_2$). The above condition corresponds to low dips as can be seen in equations (48) and (50). The above considerations imply that to preserve low dips will require $$|fA_2(A_1 - A_2)t_2| \gg 1. \tag{89}$$

Inequality (89) cannot be satisfied, if the two offsets are nearly equal. If the offsets become equal, $A_1 = A_2$, and inequality (89) is violated. Therefore, the stationary phase approximation is valid only for significant changes in offset. Note that from inequality (89) the stationary phase approximation will also break down in the near field (i.e., $ft_2 \ll 1$), which occurs at shallow times or low frequencies. If we assume we are in the far field (i.e., $ft_2 \gg 1$), then making the difference in the A factors greater than one will insure inequality (89) is honored. Since the A factors are always greater than one we can neglect the first factor of $A_2$ and require that $$|A_1 - A_2| \geq 1. \tag{90}$$

Using the formula for the A factors from equation (65) expanded for small dips or high frequency (i.e., k/f is small) the following constraint can be derived:

$$|A_1 - A_2| \approx \frac{1}{2}\left|\left(\left(\frac{h_1}{t_2}\right)^2 - \left(\frac{h_2}{t_2}\right)^2\right)\left(\frac{k}{f}\right)^2\right| \geq 1, \tag{91}$$

where we have replaced $t_1$ with $t_2$ since inequality (89) was derived with this approximation. Equation (91) can be rearranged as follows:

$$\left|(h_1^2 - h_2^2)\left(\frac{1}{ft_2}\right)^2\right| \geq 2\left(\frac{1}{k}\right)^2. \tag{92}$$

Now the maximum value of k is related to the CMP sampling interval using inequality (85). Since inequality (85) defines a lower found on $1/k$, we will require that the quantity on the left-hand side of inequality (92) satisfy the following inequality:

$$\left|(h_1^2 - h_2^2)\left(\frac{1}{ft_2}\right)^2\right| \geq 2(2\Delta x_m)^2, \tag{93}$$

which can be rearranged as follows:

$$t_2^2 \leq \frac{1}{8}\left|(h_1^2 - h_2^2)\left(\frac{1}{f\Delta x_m}\right)^2\right|. \tag{94}$$

Inequality (94) should be used to evaluate the accuracy of the stationary phase approximation. This is a condition that is either ignored or only mentioned in passing in most discussions of DMO or offset continuation. In practice, the peak frequency of the seismic signal can be used in inequality (94). If inequality (94) is violated, then the small change in offset approximation should be used. This approximation is derived in the next subsection.

We will now derive the stationary phase approximation for offset transformation. Define the following integral which is the wavenumber integral from equation (59):

$$I = \int dk\, J_{21} e^{i\Phi}. \tag{95a}$$

Then equation (59) can be rewritten as $$W(t_2, x_2, h_2) = \int df e^{i2\pi f t_2} W(f, x_2, h_2) = \int\int dt_1 dx_1 \int df W(t_1, x_1, h_1). \tag{95b}$$

The theory of stationary phase approximation tells us that if condition (88) is true, then $$I \approx \sqrt{\frac{i2\pi}{\frac{\partial^2 \Phi}{\partial k^2}(k_s)}} J_{21}(k_s) e^{i\Phi(k_s)}, \tag{96}$$

where $k_s$ is the only stationary point in the phase derived from the following equation:

$$\frac{\partial \Phi}{\partial k}(k_s) = 0. \tag{97}$$

If there were more than one wavenumber value which satisfied equation (97), then equation (96) would have the sum of similar terms evaluated at each stationary phase value. However, the phase associated with offset transformation has only one point which satisfies equation (97). The phase in equation (63) can be rewritten as follows:

$$\Phi(f, k/f, t_2, h_2, t_1, h_1) = 2\pi f\left\{A_2(A_2 t_2 - A_1 t_1) - \frac{k}{f}(x_2 - x_1)\right\}, \tag{98}$$

which shows that the phase is always a function of k in the combination k/f. Define the following functions $$\kappa \equiv \frac{k}{f}, \tag{99a}$$

and $$\Psi(\kappa, t_2, h_2, t_1, h_1) = 2\pi\{A_2(A_2 t_2 - A_1 t_1) - \kappa(x_2 - x_1)\}. \tag{99b}$$

Substitute equation (99b) into equation (98) as follows:

$$\Phi(f, \kappa, t_2, h_2, t_1, h_1) = f\Psi(\kappa, t_2, h_2, t_1, h_1). \tag{100}$$

Equation (100) describes a very important property of the phase which will allow us to solve the stationary phase calculation in a generic form. Property (100) will remove all of the frequency dependence from $J_{21}$ at the stationary phase value and make $\Phi(\kappa)$ simply proportional to frequency at the stationary phase value.

Use equation (100) to rewrite approximation (96) as follows:

$$I \approx \sqrt{\frac{-i2\pi f}{\frac{\partial^2 \Psi}{\partial \kappa^2}(\kappa_s, t_2, h_2, t_1, h_1)}} J_{21}(\kappa_s) e^{i2\pi f \Psi(\kappa_s, t_2, h_2, t_1, h_1)}. \tag{101}$$

Use equation (100) to evaluate the derivative in equation (97) as follows:

$$\frac{\partial \Phi}{\partial k} = f\frac{\partial \Psi}{\partial k} = f\frac{\partial \kappa}{\partial k}\frac{\partial \Psi}{\partial \kappa} = \frac{\partial \Psi}{\partial \kappa}. \tag{102}$$

Substitute equation (102) into equation (97) as follows:

$$\frac{\partial \Psi}{\partial \kappa}(\kappa_s) = 0. \tag{103}$$

If the partial derivative function in equation (103) describes a one-to-one map of $\kappa$ onto the real numbers r, then there exists an inverse function F(r) which will reverse the one-to-one map from r to $\kappa$. Therefore, $$\kappa_s = F(0, t_2, h_2, t_1, h_1), \tag{104}$$

where 0 is the value from equation (103) which is mapped to $\kappa_s$ by the function F. The function F is a function of $t_1$, $h_2$, $t_2$, and $h_2$ but not f. Thus $\kappa_s$ or the ratio $k_s/f$ is not a function of frequency.

Substitute approximation (101) into equation (95b) as follows:

$$W(t_2, x_2, h_2) \approx \tag{105}$$

$$\int\int dt_1 dx_1 \int df \sqrt{\frac{-i2\pi f}{\frac{\partial^2 \Psi}{\partial \kappa^2}(\kappa_s)}} J_{21}(\kappa_s) e^{-i2\pi f \Psi(\kappa_s)} W(t_1, x_1, h_1),$$

where the dependence on $t_1$, $h_1$, $t_2$, and $h_2$ has been omitted for compactness.

Now we will make use of the identity $$\hat{\partial}^{1/2}(\pm t)\delta(g) = \int df \sqrt{\pm i2\pi f}\, e^{i2\pi f g}, \tag{106a}$$

Where g is a function with only one zero and $\hat{\partial}^{1/2}(\pm t)$ is the operator defined by $$\hat{\partial}^{1/2}(\pm t)G(t) = G^{(1/2)}(\pm t) \equiv \int df e^{i2\pi f t}\sqrt{\pm i2\pi f}\, G(f), \tag{106b}$$

which is called the square-root-derivative operator or the rho filter. Apply equation (106a) to equation (105) as follows:

$$W(t_2, x_2, h_2) \approx \hat{\partial}^{1/2}\left(-\text{sign}\left(\frac{\partial^2 \Psi}{\partial \kappa^2}(\kappa_s)\right)t_2\right)\int\int dt_1 dx_1 \sqrt{\frac{1}{\left|\frac{\partial^2 \Psi}{\partial \kappa^2}(\kappa_s)\right|}} J_{21}(\kappa_s)\delta(\Psi(\kappa_s))W(t_1, x_1, h_1). \quad (107a)$$

The sign of the second partial derivative in equation (107a) depends only on the sign of the offsets. This is due to the monotonic property of the time mapping in equations (52a–b). If $h_2 < h_1$, then $t_2 < t_1$ and a negative phase shift from the half-derivative operator is required to compensate for the positive phase shifts of the time mapping. If $h_2 > h_1$, then $t_2 < t_1$ and a positive phase shift from the half-derivative operator is required to compensate for the negative phase shifts of the time mapping. Therefore, the sign of the second partial derivative is given by $\text{sign}(h_2 - h_1)$. Making this substitution in equation (107a) yields $$W(t_2, x_2, h_2) \approx \hat{\partial}^{1/2}(\text{sign}(h_2 - h_1)t_2)\int\int dt_1 dx_1 \sqrt{\frac{1}{\left|\frac{\partial^2 \Psi}{\partial \kappa^2}(\kappa_s)\right|}} J_{21}(\kappa_s)\delta(\Psi(\kappa_s))W(t_1, x_1, h_1). \quad (107b)$$

The delta function in equation (107b) will select particular values of $W(t_1, x_1, h_1)$ whenever the argument of the delta function is zero. However, the weighting of each sample depends on the derivative of the argument using the following identity:

$$\int dt_1 \delta(a(t_1))b(t_1) = \frac{1}{\left|\frac{\partial a}{\partial t}(t_{zero})\right|} b(t_{zero}), \quad (108)$$

where $t_{zero}$ is the only point at which $a(t_{zero})=0$. If there is more than one zero in the function a, then equation (108) must be modified to sum over all of the zeros. Using identity (108), approximation (107b) can be modified as follows:

$$W(t_2, x_2, h_2) \approx \quad (109a)$$
$$\hat{\partial}^{1/2}(\text{sign}(h_2 - h_1)t_2)\int\int dt_1 dx_1 \sqrt{\frac{1}{\left|\frac{\partial^2 \Psi}{\partial \kappa^2}(\kappa_s)\right|}} \frac{J_{21}(\kappa_s)}{\left|\frac{\partial \Psi(\kappa_s)}{\partial t_1}\right|}\delta(t_1 - t_{zero})W(t_1, x_1, h_1),$$

which can be integrated over $t_1$ as follows:

$$W(t_2, x_2, h_2) \approx \hat{\partial}^{1/2}(\text{sign}(h_2 - h_1)t_2)\int dx_1 \sqrt{\frac{1}{\left|\frac{\partial^2 \Psi}{\partial \kappa^2}(\kappa_s)\right|}} \frac{J_{21}(\kappa_s)}{\left|\frac{\partial \Psi(\kappa_s)}{\partial t_1}\right|} W(t_{zero}, x_1, h_1). \quad (109b)$$

This completes the symbolic solution of the offset transformation problem. Note that the only property of the phase we have used to derive equation (109b) is equation (100). In order to apply equation (109b), expressions for $t_{zero}$, the two partial derivatives, the stationary phase point, and the A factors in the Jacobian are required. These expressions are derived below.

Solving the problem in this way reduces the problem to specifying the kinematic relationship between the time and midpoint variables. From equation (57) we can see that the phase function $\Psi$ is zero when a point on the input $t_1$, $x_1$ maps to a point on the output $t_2$, $x_2$. In other words, the kinematic relationships imbedded in the phase and derived from equations (37) and (38) are satisfied. The relationship between time and midpoint coordinates on the two offsets is given by equations (52a–b). Using equations (52a–b) we can calculate $t_{zero}$ as follows:

$$t_{zero} = t_2 h_1 \sqrt{\frac{2}{U+V}} \quad \text{if } h_2 < h_1, \quad (109c)$$

and $$t_{zero} = \frac{t_2}{h_2}\sqrt{\frac{U+V}{2}} \quad \text{if } h_2 > h_1, \quad (109d)$$

where U and V are functions of the half offsets and the change in midpoint defined in equations (52c–d). Since $t_{zero}$ corresponds to the value of $t_1$ which is mapped to $t_2$ on output, we can use the kinematic identity (37) to express $t_{zero}$ in terms of the A factors as follows:

$$t_{zero} = \frac{A_1}{A_2}t_2. \quad (109e)$$

The phase function $\Psi$ is zero at the points which contribute to the stationary phase approximation in equation (107b). We can use this relationship to evaluate the stationary phase value. This approach is much simpler than solving equation (103) directly. Set equation (99b) evaluated at the stationary phase point equal to zero as follows:

$$0 = 2\pi\{A_2(A_2 t_2 - A_1 t_1) - \kappa_s(x_2 - x_1)\}, \quad (110)$$

and solve equation (110) for $\kappa_s$ as follows:

$$\kappa_s = \frac{A_2(A_2 t_2 - A_1 t_1)}{x_2 - x_1}. \quad (111)$$

It will sometimes be more convenient to replace $t_2$ with $t_1 A_2/A_1$ in equation (111), and it will sometimes be more convenient to replace $t_1$ with $t_2 A_1/A_2$. These replacements are allowed since the stationary phase solution honors the kinematic relationships. Make these substitutions in equation (111) to obtain $$\kappa_s = \frac{\frac{A_2}{A_1}(A_2^2 - A_1^2)t_1}{x_2 - x_1}, \quad (112a)$$

and $$\kappa_s = \frac{(A_2^2 - A_1^2)t_2}{x_2 - x_1}. \quad (112b)$$

The stationary phase approximation requires expressions for the derivatives in the denominator of equation (109b). These derivatives are then evaluated at the stationary phase point given by equations (112a–b). First evaluate the second derivative of the phase function $\Psi$ defined in equation (99b) as follows:

$$\frac{\partial \Psi}{\partial \kappa} = 2\pi \left\{ t_2 2A_2 \frac{\partial A_2}{\partial \kappa} - t_1 \left( \frac{\partial A_2}{\partial \kappa} A_1 + A_2 \frac{\partial A_1}{\partial \kappa} \right) - (x_2 - x_1) \right\}, \quad (113a)$$

and $$\frac{\partial^2 \Psi}{\partial \kappa^2} = 2\pi \left\{ 2t_2 \left( A_2 \frac{\partial^2 A_2}{\partial \kappa^2} + \left( \frac{\partial A_2}{\partial \kappa} \right)^2 \right) - t_1 \left( \frac{\partial^2 A_2}{\partial \kappa^2} A_1 + 2 \frac{\partial A_2}{\partial \kappa} \frac{\partial A_1}{\partial \kappa} + A_2 \frac{\partial^2 A_1}{\partial \kappa^2} \right) \right\}. \quad (113b)$$

Use equation (66a) to evaluate the partial derivatives of $A_2$ as follows:

$$\frac{\partial A_2}{\partial \kappa} = \frac{1}{A_2} \frac{1}{2A_2^2 - 1} \left( \frac{h_2}{t_2} \right)^2 \kappa, \quad (113c)$$

and $$\frac{\partial A_2}{\partial \kappa} = \frac{1}{A_2} \frac{1}{2A_2^2 - 1} \left( \frac{h_2}{t_2} \right)^2 \left( 1 - \left( \frac{1}{A_2^2} + \frac{4}{(2A_2^2 - 1)^2} \right) \frac{1}{2A_2^2 - 1} \left( \frac{h_2}{t_2} \right)^2 \kappa^2 \right). \quad (113d)$$

Use equation (66b) to evaluate the partial derivatives of $A_1$ as follows:

$$\frac{\partial A_1}{\partial \kappa} = \left( \frac{h_1}{t_1} \right)^2 \frac{1}{A_1} \frac{1}{A_2^2} \left( \kappa - \frac{1}{A_2^2(2A_2^2 - 1)} \left( \frac{h_2}{t_2} \right)^2 \kappa^3 \right), \quad (113e)$$

and $$\frac{\partial^2 A_1}{\partial \kappa^2} = \left( \frac{h_1}{t_1} \right)^2 \frac{1}{A_1 A_2^2} H(\kappa), \quad (113f)$$

where $$H(\kappa) \equiv \quad (113g)$$

$$\left\{ \left[ 1 - \frac{\left( \frac{h_1}{t_1} \right)^2 (2A_2^2 - 1) + \left( \frac{h_2}{t_2} \right)^2 A_1^2}{A_1^2 A_2^2 (2A_2^2 - 1)} \kappa^2 + \frac{\left( \frac{h_1 h_2}{t_1 t_2} \right)^2}{A_1^2 A_2^2 (2A_2^2 - 1)} \kappa^4 \right] - \frac{\left( \frac{h_2}{t_2} \right)^2 \kappa^2}{A_2^2 (2A_2^2 - 1)} \left[ 3 - \frac{\left( \frac{h_1}{t_1} \right)^2 (2A_2^2 - 1)^2 + 4 \left( \frac{h_2}{t_2} \right)^2 A_1^2 (3A_2^2 - 1)}{A_1^2 A_2^2 (2A_2^2 - 1)^2} \kappa^2 + \frac{\left( \frac{h_1 h_2}{t_1 t_2} \right)^2}{A_1^2 A_2^4 (2A_2^2 - 1)} \kappa^4 \right] \right\}.$$

The second partial derivative in equation (113b) will be evaluated at the stationary phase point inside equation (109b) using equation (112a). It is more convenient to replace the values of $t_2$ in equations (113c–g) with $t_1 A_2/A_1$. Later, this replacement will allow us to take the half derivative operator inside the integral and apply it to the input data. Make the above substitution into equations (113b–g) to obtain the following:

$$\frac{\partial^2 \Psi}{\partial \kappa^2}(\kappa_s) = 2\pi t_1 \left\{ 2 \frac{A_2}{A_1} \left( A_2 \frac{\partial^2 A_2}{\partial \kappa^2} + \left( \frac{\partial A_2}{\partial \kappa} \right)^2 \right) - \left( \frac{\partial^2 A_2}{\partial \kappa^2} A_1 + 2 \frac{\partial A_2}{\partial \kappa} \frac{\partial A_1}{\partial \kappa} + A_2 \frac{\partial^2 A_1}{\partial \kappa^2} \right) \right\}_{\kappa_s}. \quad (114a)$$

$$\frac{\partial A_2}{\partial \kappa}(\kappa_s) = \frac{A_1^2}{A_2^3} \frac{1}{2A_2^2 - 1} \left( \frac{h_2}{t_1} \right)^2 \kappa_s. \quad (114b)$$

$$\frac{\partial^2 A_2}{\partial \kappa^2}(\kappa_s) = \quad (114c)$$

$$\frac{A_1^2}{A_2^3} \frac{1}{2A_2^2 - 1} \left( \frac{h_2}{t_1} \right)^2 \left( 1 - \left( \frac{1}{A_2^2} + \frac{4}{(2A_2^2 - 1)^2} \right) \frac{A_1^2/A_2^2}{2A_2^2 - 1} \left( \frac{h_2}{t_1} \right)^2 \kappa_s^2 \right).$$

$$\frac{\partial A_1}{\partial \kappa}(\kappa_s) = \left( \frac{h_1}{t_1} \right)^2 \frac{1}{A_1} \frac{1}{A_2^2} \left( \kappa_s - \frac{A_1^2}{A_2^4(2A_2^2 - 1)} \left( \frac{h_2}{t_1} \right)^2 \kappa_s^3 \right). \quad (114d)$$

and $$\frac{\partial^2 A_1}{\partial \kappa^2} = \left( \frac{h_1}{t_1} \right)^2 \frac{1}{A_1 A_2^2} H(\kappa_s), \quad (114e)$$

where

-continued $$H(\kappa_s) \equiv \left\{ \left[ 1 - \frac{\left(\frac{h_1}{t_1}\right)^2 (2A_2^2 - 1) + \left(\frac{h_2}{t_1}\right)^2 \frac{A_1^2}{A_2^2}}{A_1^2 A_2^2 (2A_2^2 - 1)} \kappa_s^2 + \right. \right.$$ (114f)

$$\left. \frac{\frac{A_1^2}{A_2^2}\left(\frac{h_1 h_2}{t_1^2}\right)^2}{A_1^2 A_2^2 (2A_2^2 - 1)} \kappa_s^4 \right] - \frac{A_1^2 \left(\frac{h_2}{t_1}\right)^2 \kappa_s^2}{A_2^4 (2A_2^2 - 1)} \left[ 3 - \right.$$

$$\frac{\left(\frac{h_1}{t_1}\right)^2 (2A_2^2 - 1)^2 + 4\left(\frac{h_2}{t_1}\right)^2 \frac{A_1^4}{A_2^2}(3A_2^2 - 1)}{A_1^2 A_2^2 (2A_2^2 - 1)^2} \kappa_s^2 +$$

$$\left. \left. \frac{\frac{A_1^2}{A_2^2}\left(\frac{h_1 h_2}{t_1^2}\right)^2}{A_1^2 A_2^4 (2A_2^2 - 1)} \kappa_s^4 \right] \right\}.$$

In order to evaluate the partial derivative with respect to $t_1$ we will first show that the A factors are independent of $t_1$. First we will show that the A factors depend only on the ratio of $t_2/t_1$. Substitute equation (48) into (34) to obtain the following:

$$A_n = \sqrt{1 + \left(\frac{h_n}{t_n}\right)^2 \left(\frac{t_1^2 - t_2^2}{\left(\frac{h_1 t_2}{t_1}\right)^2 - \left(\frac{h_2 t_1}{t_2}\right)^2}\right)},$$ (115a)

which yields the following expressions for $A_1$ and $A_2$:

$$A_1 =$$ (115b)

$$\sqrt{\left(\frac{t_1}{t_2}\right)^2 1 - \frac{\left(\frac{h_2 t_1}{h_1 t_2}\right)^2}{1 - \left(\frac{h_2}{h_1}\right)^2 \left(\frac{t_1}{t_2}\right)^4}} = \sqrt{\frac{\left(\frac{h_1 t_2}{h_2 t_1}\right)^2 - 1}{\left(\frac{h_1}{h_2}\right)^2 \left(\frac{t_2}{t_1}\right)^4 - 1}},$$

and $$A_2 = \sqrt{\frac{1 - \left(\frac{h_2 t_1}{h_1 t_2}\right)^2}{1 - \left(\frac{h_2}{h_1}\right)^2 \left(\frac{t_1}{t_2}\right)^4}} =$$ (115c)

$$\sqrt{\left(\frac{t_2}{t_1}\right)^2 \left(\frac{h_1 t_2}{h_2 t_1}\right)^2 - \frac{1}{\left(\frac{h_1}{h_2}\right)^2 \left(\frac{t_2}{t_1}\right)^4 - 1}}.$$

Both equations (115b) and (115c) depend only on the ratio $t_2/t_1$. Therefore, from equations (52a–b) we know that the A factors are functions only of the offsets and the change in midpoint. Substitution of equations (52a–b) into equation (115b) yields the following (U and V are defined in equations (52c–d)):

$$A_1 = \sqrt{h_1^2 U + V - \frac{2h_2^2}{V(U+V)}} \quad \text{if } h_2 < h_1,$$ (116a)

and $$A_1 = \sqrt{\frac{1}{2}U + V - \frac{2h_1^2}{2V}} \quad \text{if } h_2 > h_1.$$ (116b)

Substitution of equations (52a–b) into equation (115c) yields the following:

$$A_2 = \sqrt{\frac{U + V - 2h_2^2}{2V}} \quad \text{if } h_2 < h_1,$$ (116c)

and $$A_2 = \sqrt{h_2^2 U + V - \frac{2h_1^2}{V(U+V)}} \quad \text{if } h_2 > h_1.$$ (116d)

Now if we evaluate the partial derivative with respect to $t_1$ of the phase function in equation (109b) at the stationary phase point as follows:

$$\frac{\partial \Psi(\kappa_s, t_2, h_2, t_1, h_1)}{\partial t_1} = \frac{\partial}{\partial t_1} \{A_2(A_1 t_1 - A_2 t_2) - \kappa_s(x_1 - x_2)\}.$$ (117)

Then equations (116a–d) imply that the A factors do not depend on $t_1$ and equation (112b) implies that $\kappa_s$ does not depend on $t_1$ (at this point the stationary phase value should be considered fixed by the output point $t_2$). Therefore, the derivative with respect to $t_1$ in equation (109b) is as follows:

$$\frac{\partial \Psi(\kappa_s, t_2, h_2, t_1, h_1)}{\partial t_1} = A_1 A_2.$$ (118)

This term may be combined with the Jacobian in equation (55) as follows:

$$\frac{J_{21}}{\left|\frac{\partial \Psi}{\partial t_1}\right|} = \frac{2A_1^2 - 1}{A_1^4} \frac{A_2^2}{2A_2^2 - 1}.$$ (119)

Since equation (119) depends only on half offsets and midpoints, and we can use equations (113a–g) to evaluate the second partial in equation (109b) independent of $t_2$ we may take the half-derivative operator inside the integral and apply it to the input data as follows:

$$W(t_2, x_2, h_2) \approx$$ (120)

$$\int dx_1 \sqrt{\frac{1}{\left|\frac{\partial^2 \Psi}{\partial \kappa^2}(\kappa_s)\right|}} \frac{J_{21}(\kappa_s)}{\left|\frac{\partial \Psi(\kappa_s)}{\partial t_1}\right|} \sqrt{\frac{A_1}{A_2}} W^{(1/2)}\left(\text{sign}(h_2 - h_1)\frac{A_1}{A_2} t_2, x_1, h_1\right).$$

Equation (120) can be used to define an efficient offset transformation algorithm as follows:

1. Select a trace at location $x_1$.
2. Form the rho-filtered trace using equation (106b).
3. Select an output trace location $x_2$.
4. Select an output time sample $t_2$ and compute the input time $t_{zero}$ on the rho-filtered trace from step 1 using equations (109c–d).
5. Weight each sample by the appropriate weighting function formed from the remaining terms in equation (120) (i.e., using equations (112a), (114a–i), (116a–d) and (119)) and sum onto the output common offset section. Note that weights involving the A factors are independent of time and do not need to be recalculated at each time sample.
6. Loop to step 4 over output samples $t_2$ until the output trace is filled.
7. Loop to step 3 over output traces $x_2$, where the range of $x_2$ is limited by inequality (41).
8. Loop to step 1 over input traces $x_1$.

The above algorithm should not be applied to offset transformation where the offsets are very close together. As already mentioned, the stationary phase approximation will not be valid for nearby offsets. We will now proceed to discuss this as a special case.

Small Change in Offset Approximation

Recall that condition (90) must be true in order for the stationary phase approximation to handle flat dips. Therefore, we will define the small change in offset approximation by $$A_1 \approx A_2, \quad (121a)$$

which will prevent the application of approximation (96), and of course implies $$h_1 \approx h_2. \quad (121b)$$

Apply approximations (121a) and (121b) to equation (63b) to obtain $$\Phi \approx -2\pi\{f(t_1-t_2)-k[x_1-x_2]\}. \quad (122)$$

Insert approximation (121 a) into the equation for the Jacobian (55) to obtain the following:

$$J_{21} \approx 1. \quad (123)$$

Substitute approximations (122) and (123) into equation (54b) to obtain the following approximation for offset transformation to a nearby offset:

$$W(t_2,x_2,h_2) \approx \int\int dt_1 dx_1 \int\int df\, dk\, \exp(-2\pi\{f((t_1-t_2))-k(x_1-x_2)\}) W(t_1,x_1,h_1). \quad (124)$$

Equation (124) is just a forward and inverse f-k transform which is an identity operator. Therefore, for the small change in offset approximation we obtain the following:

$$W(t_2,x_2,h_2) \approx W(t_2,x_2,h_2) \approx W(t_2,x_2,h_1), \quad (125)$$

which states that the input should just be copied onto the output.

Approximation (125) should be used whenever the change in offset is too small to justify the application of the stationary phase approximation in the previous section. Portions of traces which violate inequality (94) should not go through the usual Kirchhoff half-derivative operator and mapping. For example, if a trace has a half offset less than the stacking bin interval, the DMO operator is only one trace wide. If Kirchhoff DMO is applied, then the trace will be rho filtered and weighted and remapped onto itself. This will introduce a 45 degree phase error and a time-dependent amplitude error. In this case approximation (125) should be used. In other words, for offset transformation of nearby offsets the offsets are nearly identical, and use of the stationary phase approximation results in incorrect transformation.

We claim:

1. A method for reconstructing a seismic wavefield at a designated common midpoint and offset location from a set of prestack seismic data traces obtained from a seismic survey, each of said seismic data traces being a time series of discrete samples of the seismic signal received by a seismic receiver, said method comprising the steps of:

selecting the seismic wavefield to be reconstructed;

determining the normal moveout velocity of said seismic wavefield;

selecting a set of input data traces from said set of common midpoint seismic data traces,
said input data traces having common midpoint and offset locations proximate to said designated location;

performing a normal moveout correction of said input data traces using said normal moveout velocity of said selected seismic wavefield; and generating a reconstructed data trace representative of said seismic wavefield at said designated location by mapping each data sample on each of said normal moveout corrected input data traces onto its corresponding location on said reconstructed data trace.

2. The method of claim 1, wherein said seismic wavefield to be reconstructed is a primary wavefield.

3. The method of claim 1, wherein said seismic wavefield to be reconstructed is a secondary wavefield.

4. The method of claim 1, wherein said common midpoint and offset location of each input data trace differs from that of said designated location according to the following:

$$|\Delta \text{midpoint}| \leq \frac{|\Delta \text{offset}|}{2}$$

where $\Delta$midpoint is the change in common midpoint location from said input data trace to said designated location and $\Delta$offset is the change in offset from said input data trace to said designated location.

5. The method of claim 4, wherein the maximum value of $|(\Delta\text{offset})/(2\Delta\text{midpoint})|$ is equal to an integer multiple of the pattern number for said seismic survey.

6. The method of claim 1, wherein said reconstructed data trace is generated according to the following:

$$P(t_m,y_m,h_m) = G[d_{1/2}(\text{sign}(h_m-h_n)t_n)P(t_n,y_n,h_n)],$$

where $P(t_m,y_m,h_m)$ is the data sample at a given time, midpoint, and half offset on the reconstructed data trace, $P(t_n,y_n,h_n)$ is the input data sample at a given time, midpoint, and half offset being mapped onto the reconstructed data trace, $$G = g\left[\frac{2A_n^2(k_s)-1}{A_n^3(k_s)} \frac{A_m^3(k_s)}{2A_m^2(k_s)-1} \frac{t_m^{1/2}}{\sqrt{4\pi h_m(h_n - h_m)}\left[1 - \frac{(y_m - y_n)^2}{(h_m - h_n)^2}\right]^{3/4}}\right],$$

$$d_{1/2}(\text{sign}(h_m - h_n)t_n) = \frac{1}{2\pi}\int d\omega_m (\text{sign}(h_m - h_n)j\omega_m)^{1/2} e^{-j\omega_m t_n},$$

g is a constant multiplier empirically determined from model data which is used to scale the amplitude of the data sample on the reconstructed data trace, $$j = \sqrt{-1},$$

$$k_s = \frac{t_m \omega_m}{2h_m}\sqrt{\frac{(y_m - y_n)^2}{(h_m - h_n)^2 - (y_m - y_n)^2}},$$

$\omega_m \equiv$ angular frequency conjugate to $t_m$, $$A_m(k_s) = \left[1 + \frac{h_m^2}{A_m^2(k_s)t_m^2}\left(\frac{k_s}{\omega_m}\right)^2\right]^{1/2}, \text{ and}$$

$$A_n(k_s) = \frac{t_n}{t_m} A_m(k_s).$$

7. The method of claim 6, wherein the time of the input data sample $t_n$ is related to the time of reconstructed data sample $t_m$ according to the following:

$$t_n = t_m\sqrt{\frac{h_n}{h_m}}\sqrt{1 - \frac{h_n - h_m}{h_n}\sqrt{1 - \left(\frac{y_m - y_n}{h_n - h_m}\right)^2}}.$$

8. The method of claim 6, wherein the time of the input data sample $t_n$ is related to the time of reconstructed data sample $t_m$ according to the following:

if $h_m > h_n$, then $t_n = t_m \frac{\sqrt{\frac{U+V}{2}}}{|h_m|}$, or if $h_n > h_m$, then $t_n = t_m|h_n|\sqrt{\frac{2}{U+V}}$, where $U = h_n^2 + h_m^2 - (y_m - y_n)^2$ and $V = \sqrt{U^2 - (2h_n h_m)^2}$.

9. The method of claim 1, wherein said reconstructed data trace is generated according to the following:

$$W(t_2, x_2, h_2) \approx$$

$$g\int dx_1 \sqrt{\frac{1}{\left|\frac{\partial^2 \Psi}{\partial \kappa^2}(\kappa_s)\right|}} \frac{J_{21}(\kappa_s)}{\left|\frac{\partial \Psi(\kappa_s)}{\partial t_1}\right|} \sqrt{\frac{A_1}{A_2}}\, W^{(1/2)}\!\left(\text{sign}(h_2 - h_1)\frac{A_1}{A_2}t_2, x_1, h_1\right)$$

where g is a constant multiplier empirically determined from model data which is used to scale the amplitude of the data sample on the reconstructed data trace, $W(t_2,x_2,h_2)$ is the data sample at a given time, midpoint, and half offset on the reconstructed data trace, $$W^{(1/2)}\!\left(\text{sign}(h_2 - h_1)\frac{A_1}{A_2}t_2, x_1, h_1\right)$$

is the input data sample after application of a square-root derivative operator, $$\kappa_s = \frac{\frac{A_2}{A_1}(A_2^2 - A_1^2)t_1}{x_2 - x_1},$$

$$\frac{\partial^2 \Psi}{\partial \kappa^2}(\kappa_s) =$$

$$2\pi t_1\left\{2\frac{A_2}{A_1}\left(A_2\frac{\partial^2 A_2}{\partial \kappa^2} + \left(\frac{\partial A_2}{\partial \kappa}\right)^2\right) - \left(\frac{\partial^2 A_2}{\partial \kappa^2}A_1 + 2\frac{\partial A_2}{\partial \kappa}\frac{\partial A_1}{\partial \kappa} + A_2\frac{\partial^2 A_1}{\partial \kappa^2}\right)\right\}_{\kappa_s},$$

$$\frac{\partial A_2}{\partial \kappa}(\kappa_s) = \frac{A_1^2}{A_2^3}\frac{1}{2A_2^2 - 1}\left(\frac{h_2}{t_1}\right)^2 \kappa_s,$$

$$\frac{\partial^2 A_2}{\partial \kappa^2}(\kappa_s) = \frac{A_1^2}{A_2^3}\frac{1}{2A_2^2 - 1}\left(\frac{h_2}{t_1}\right)^2\left(1 - \left(\frac{1}{A_2^2} + \frac{4}{(2A_2^2 - 1)^2}\right)\frac{A_1^2/A_2^2}{2A_2^2 - 1}\left(\frac{h_2}{t_1}\right)^2 \kappa_s^2\right),$$

$$\frac{\partial A_1}{\partial \kappa}(\kappa_s) = \left(\frac{h_1}{t_1}\right)^2 \frac{1}{A_1}\frac{1}{A_2^2}\left(\kappa_s - \frac{A_1^2}{A_2^4(2A_2^2 - 1)}\left(\frac{h_2}{t_1}\right)^2 \kappa_s^3\right),$$

$$\frac{\partial^2 A_1}{\partial \kappa^2}(\kappa_s) = \left(\frac{h_1}{t_1}\right)^2 \frac{1}{A_1 A_2^2} H(\kappa_s),$$

$$H(\kappa_s) \equiv$$

-continued $$\left\{ \left[ 1 - \frac{\left(\frac{h_1}{t_1}\right)^2 (2A_2^2 - 1) + \left(\frac{h_2}{t_1}\right)^2 \frac{A_1^2}{A_2^2}}{A_1^2 A_2^2 (2A_2^2 - 1)} \kappa_s^2 + \frac{\frac{A_1^2}{A_2^2}\left(\frac{h_1 h_2}{t_1^2}\right)^2}{A_1^2 A_2^2 (2A_2^2 - 1)} \kappa_s^4 \right] - \frac{A_1^2 \left(\frac{h_2}{t_1}\right)^2 \kappa_s^2}{A_2^4 (2A_2^2 - 1)} \right[ 3 -$$

$$\frac{\left(\frac{h_1}{t_1}\right)^2 (2A_2^2 - 1)^2 + 4\left(\frac{h_2}{t_1}\right)^2 \frac{A_1^4}{A_2^2}(3A_2^2 - 1)}{A_1^2 A_2^2 (2A_2^2 - 1)^2} \kappa_s^2 + \frac{\frac{A_1^4}{A_2^2}\left(\frac{h_1 h_2}{t_1^2}\right)^2}{A_1^2 A_2^4 (2A_2^2 - 1)} \kappa_s^4 \right] \right\},$$

$$A_1 = \sqrt{h_1^2 U + V - \frac{2h_2^2}{V(U+V)}} \quad \text{if } h_2 < h_1,$$

$$A_1 = \sqrt{\frac{1}{2}U + V - \frac{2h_1^2}{V}} \quad \text{if } h_2 > h_1,$$

$$A_2 = \sqrt{\frac{h_1^2}{2}U + V - \frac{2h_2^2}{V}} \quad \text{if } h_2 < h_1,$$

$$A_2 = \sqrt{\frac{U + V - 2h_1^2}{V(U+V)}} \quad \text{if } h_2 > h_1,$$

and $$\frac{J_{21}}{\left|\frac{\partial \Psi}{\partial t_1}\right|} = \frac{2A_1^2 - 1}{A_1^4} \frac{A_2^2}{2A_2^2 - 1}.$$

10. The method of claim 1, wherein said set of input data traces comprises (i) the data trace having the same midpoint and the nearest offset greater than said designated location and (ii) the data trace having the same midpoint and the nearest offset less than said designated location, and wherein said reconstructed data trace is generated by copying weighted versions of said two input data traces to said designated location and summing them.

11. The method of claim 10, wherein said two input data traces are weighted using cosine weights based on the separations between said input data traces and said designated location.

12. The method of claim 10, wherein said method further comprises the step of using a muting process to preserve the primary reflections in said set of input data traces, said muting process being based on the following equation:

$$t_{NMO} = C_{mute} \left| f_{max} h \Delta h \left( \left(\frac{\cos\alpha}{V}\right)^2 - \frac{1}{V_{NMO}^2} \right) \right|,$$

where $t_{NMO}$ is the arrival time after NMO, $C_{mute}$ is a constant typically equal to 8, $f_{max}$ is the maximum frequency which is still in phase after NMO, h is the offset of the input data trace, $\Delta h$ is the change in offset between the input data trace and the reconstruction location, $\alpha$ is the angle of reflector dip, V is the primary root-mean-square (RMS) velocity, and $V_{NMO}$ is the normal moveout velocity of the selected wavefield.

13. A method for generating a reconstructed data trace representative of a selected seismic wavefield at a designated common midpoint and offset location, said method comprising the steps of:
obtaining a set of prestack seismic data traces having common midpoint and offset locations proximate to said designated location, each of said prestack seismic data traces being a time series of discrete samples of the seismic signal received at a seismic receiver;

determining the normal moveout velocity of said selected seismic wavefield;
performing a normal moveout correction of said prestack seismic data traces using said normal moveout velocity of said selected seismic wavefield; and
generating each data sample on said reconstructed data trace by
determining the time on each of said normal moveout corrected seismic data traces which corresponds to said data sample,
determining the amplitude of each of said normal moveout corrected seismic data traces at said corresponding time, and
mapping each of said corresponding amplitude values onto said reconstructed data trace to obtain the amplitude value for said data sample.

14. The method of claim 13, wherein said selected seismic wavefield is a primary wavefield.

15. The method of claim 13, wherein said selected seismic wavefield is a secondary wavefield.

16. The method of claim 13, wherein said common midpoint and offset location of each of said set of prestack seismic data traces differs from that of said designated location according to the following:

$$|\Delta \text{midpoint}| \leq \frac{|\Delta \text{offset}|}{2}$$

where $\Delta$midpoint is the change in common midpoint location from said prestack seismic data trace to said designated location and $\Delta$offset is the change in offset from said prestack seismic data trace to said designated location.

17. The method of claim 16, wherein the maximum value of $|(\Delta\text{offset})/(2\Delta\text{midpoint})|$ is equal to an integer multiple of the pattern number for said seismic survey.

* * * * *